US011811797B2

(12) United States Patent
Almasan et al.

(10) Patent No.: US 11,811,797 B2
(45) Date of Patent: Nov. 7, 2023

(54) MACHINE LEARNING METHODS AND SYSTEMS FOR DEVELOPING SECURITY GOVERNANCE RECOMMENDATIONS

(71) Applicant: MCKINSEY & COMPANY, INC., New York, NY (US)

(72) Inventors: Rares Almasan, Phoenix, AZ (US); Anthony Esposito, South Orange, NJ (US); Sriram Venkatesan, Princeton Junction, NJ (US); Sastry Vsm Durvasula, Phoenix, AZ (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 17/716,030

(22) Filed: Apr. 8, 2022

(65) Prior Publication Data

US 2023/0328075 A1 Oct. 12, 2023

(51) Int. Cl.
*H04L 9/40* (2022.01)
*G06N 3/08* (2023.01)

(52) U.S. Cl.
CPC .......... *H04L 63/1416* (2013.01); *G06N 3/08* (2013.01)

(58) Field of Classification Search
CPC .............................. H04L 63/1416; G06N 3/08
See application file for complete search history.

(56) References Cited

U.S. PATENT DOCUMENTS

| 10,242,201 | B1* | 3/2019 | Chen | G06F 21/552 |
|---|---|---|---|---|
| 2016/0219078 | A1* | 7/2016 | Porras | H04L 41/12 |
| 2018/0270265 | A1* | 9/2018 | Sage | H04L 63/1425 |
| 2019/0166154 | A1* | 5/2019 | Steele | H04L 63/1408 |
| 2019/0182287 | A1* | 6/2019 | Hanley | H04L 63/20 |
| 2019/0303608 | A1* | 10/2019 | Cohen | G06N 3/08 |
| 2019/0340353 | A1* | 11/2019 | Mitelman | G06F 21/554 |
| 2020/0004957 | A1* | 1/2020 | Chamaraju | G06N 7/005 |
| 2020/0344256 | A1* | 10/2020 | Alabdulhadi | H04L 63/1416 |

* cited by examiner

*Primary Examiner* — Beemnet W Dada
(74) *Attorney, Agent, or Firm* — MARSHALL, GERSTEIN & BORUN LLP; Randall G. Rueth

(57) ABSTRACT

Machine learning methods and systems for developing security governance recommendations are disclosed. An example method includes: accessing threat assessment knowledge data representative of security threats and threat patterns; accessing security solution knowledge data representative of security solutions; obtaining first security state data representing a current security state of a current computing environment; obtaining second security state data representing a future security state for a future secured-by-design computing environment; analyzing, using one or more first trained machine learning (ml) models, one or more of (i) the threat assessment knowledge data, (ii) the security solution knowledge data, (iii) the first security state data, or (iv) the second security state data to develop one or more aspects of a security governance recommendation for the future secured-by-design computing environment; and causing the one or more aspects of the security governance to be displayed on a computing device.

17 Claims, 10 Drawing Sheets

MACHINE LEARNING METHODS AND SYSTEMS FOR DEVELOPING SECURITY GOVERNANCE RECOMMENDATIONS

FIELD OF THE DISCLOSURE

The present disclosure is generally directed to security governance recommendations, and more particularly, to machine learning (ML) methods and systems for developing security governance recommendations.

BACKGROUND

The high velocity of technological advancements can help companies continuously develop new and/or improved products. However, it also brings profound security challenges. Bad actors can also leverage cutting edge technologies to commit cybersecurity crimes. For example, they can leverage artificial intelligence (AI) and ML to learn from past exploits to identify and exploit vulnerabilities in an entity's systems. Accordingly, the complexity, frequency, and scope of cybersecurity crimes is ever increasing.

SUMMARY

In an example, a method implemented by one or more processors includes: accessing threat assessment knowledge data representative of at least one of past security threat patterns, present security threat patterns, new security threat patterns, or evolving security threat patterns; accessing security solution knowledge data representative of at least one of past security solutions, present security solutions, new security solutions, or evolving security solutions; obtaining first security state data representing a current security state of a current computing environment; obtaining second security state data representing a future security state for a future secured-by-design computing environment; analyzing, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment; and causing the one or more aspects of the security governance to be displayed on a computing device.

In yet another example, a computing system includes one or more processors, and a non-transitory, computer-readable storage medium storing computer-readable instructions. The instructions, when executed by the one or more processors, cause the computing system to: access threat assessment knowledge data representative of at least one of past security threat patterns, present security threat patterns, new security threat patterns, or evolving security threat patterns; access security solution knowledge data representative of at least one of past security solutions, present security solutions, new security solutions, or evolving security solutions; obtain first security state data representing a current security state of a current computing environment; obtain second security state data representing a future security state for a future secured-by-design computing environment; analyze, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment; and cause the one or more aspects of the security governance to be displayed on a computing device.

In a still further example, a non-transitory, computer-readable, storage medium stores computer-readable instructions that, when executed by one or more processing devices, cause a system to: access threat assessment knowledge data representative of at least one of past security threat patterns, present security threat patterns, new security threat patterns, or evolving security threat patterns; access security solution knowledge data representative of at least one of past security solutions, present security solutions, new security solutions, or evolving security solutions; obtain first security state data representing a current security state of a current computing environment; obtain second security state data representing a future security state for a future secured-by-design computing environment; analyze, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment; and cause the one or more aspects of the security governance to be displayed on a computing device.

BRIEF DESCRIPTION OF THE DRAWINGS

The accompanying figures, where like reference numerals refer to identical or functionally similar elements throughout the separate views, together with the detailed description below, are incorporated in and form part of the disclosure, and serve to further illustrate examples of concepts that include the claimed invention, and explain various principles and advantages of those examples.

Figure 1:
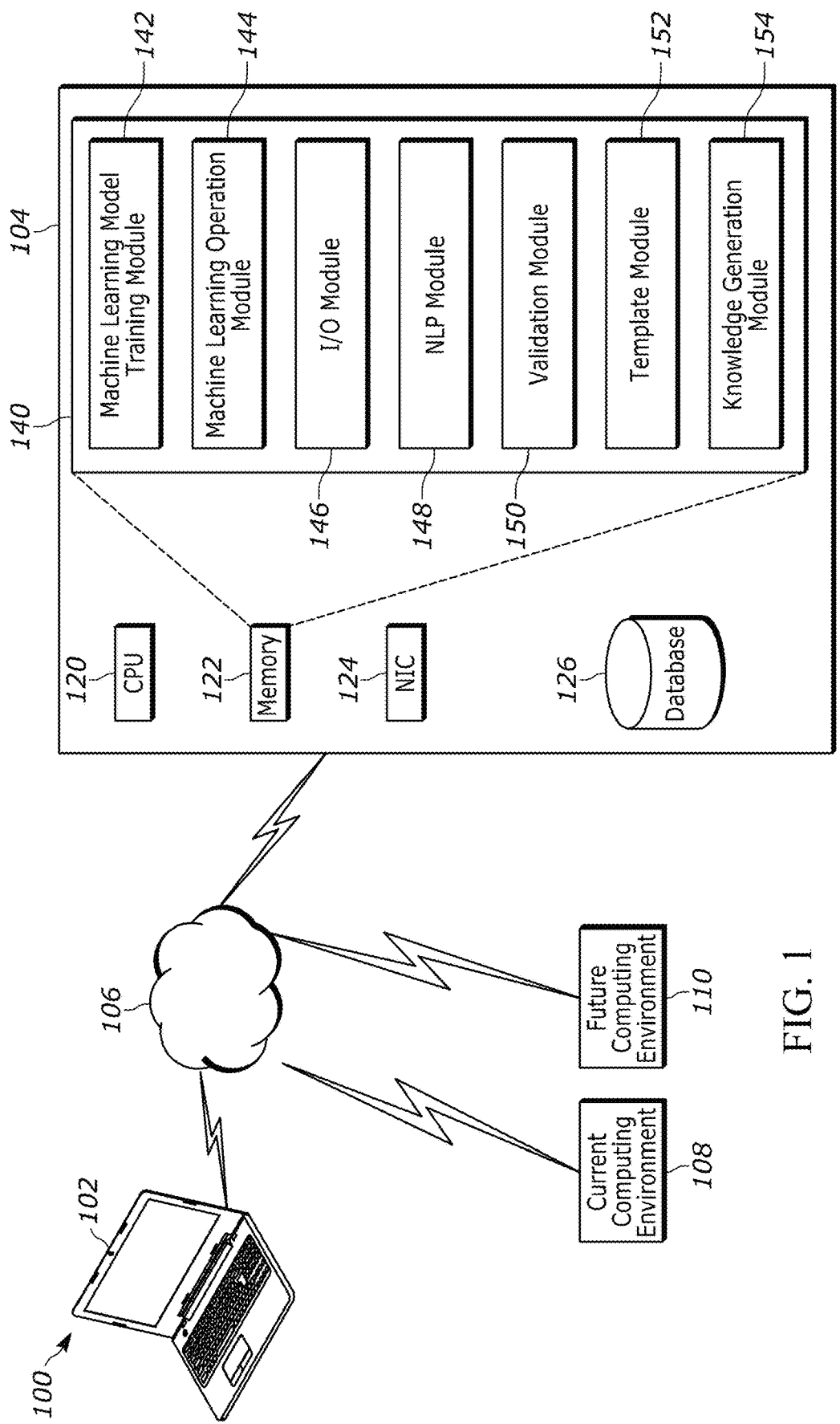
FIG. 1 is block diagram of an example computing environment for assessing security threats and making security governance recommendations, according to the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples of the disclosure.

The apparatus and method components have been represented where appropriate by conventional symbols in the drawings, showing only those specific details that are pertinent to understanding the examples of the disclosure so as not to obscure the disclosure with details that will be readily apparent to those of ordinary skill in the art having the benefit of the description herein.

DETAILED DESCRIPTION

To design a secure and robust system, it is important to have a full understanding of past, current, and future industries, domains, system architectures, data storage solutions, security systems, security methods, threats, and threat patterns, to name a few. Such knowledge can be used to identify threats and develop security solutions that defend against those threats. However, given rapid changes in and complexity of evolving systems and threats, it can be difficult to fully, timely, and/or consistently secure a system.

For example, a team of consultants might work on a client security engagement for a retail enterprise to assess and improve their security defenses to protect their on-premise and cloud computing environments. However, sometimes, the consultants may not have full or sufficient knowledge regarding relevant security controls that should deployed. In another example, companies looking to bring new products to market and/or improving features of existing products may not have full or sufficient knowledge of the security solutions applicable to their company, industry, domain, and/or geographic region. In both examples, persons tasked with securing a computing environment may be unable to manually determine and deploy the necessary, applicable, and best-in-class security solutions. Accordingly, there is a need for methods and systems for developing security governance recommendations. Moreover, such methods and systems should be capable of capturing and codifying security knowledge data for various industries, businesses, domains, such that disclosed methods and systems are capable of fully comprehending a customer's security needs, and developing applicable and best-in-class security governance recommendations.

Example machine learning (ML) systems and methods for developing security governance recommendations based upon curated and codified security knowledge data representing threats and/or threat patterns, and/or remediation and/or security solutions are disclosed. Example systems needing to be secured include cloud platforms and hybrid-cloud platforms that are based on modularized, scalable, and/or re-usable architectures. Example security governance recommendations include security principles, security standards, security practices, and/or security controls that can be used to define and/or create a system and/or system architecture that is "secured by design." Disclosed systems and methods continuously collect security information representing past, present, and future internal and external security threat patterns; and past, present, and future security solutions; intelligent cloud, data and technology solutions; domain expertise; and ML and/or artificial intelligence (AI) for exploring and experimenting with alternative system architectures, for example. Disclosed systems and methods process collected security information to form classified, curated, and codified security knowledge data. Disclosed systems and methods train and/or update, based upon the security knowledge data, one or more machine learning models for detecting past, present, new and evolving threat patterns, and for developing security governance recommendations that remediate past, present, new, and evolving threat patterns. Such security governance recommendations can be implemented, automatically and/or manually, to provide a secured-by-design system that is visible, transparent, and consistently available using proactive, relevant, and cutting-edge security solutions that, among other things, provide data privacy and security in the face of new and evolving threats. Example ML systems and methods can also continuously innovate by identifying new and evolving threats and/or threat patterns, and the effectiveness, efficiency and applicability of remediation and/or security solutions for the new and evolving threats. For example, the ML systems and methods can be continually trained or updated using security knowledge data representing new and evolving threats, threat patterns, security solutions, and/or remediation solutions.

Disclosed example systems and methods provide a scalable set of artificial intelligence and/or machine learning capabilities that can recommend and influence how security should be built into systems. Disclosed examples facilitate the federation of security best practices, ready to use secured-by-design frameworks, and/or reusable code by converting them into codified security object configurations that can be used to secure a system.

For clarity of explanation, the following description will refer to the information accessed, collected, scraped, or otherwise obtained from any number and/or type(s) of data sources as "collected information." Collected information may include any number and/or type(s) of information. Moreover, collected information can be structured, unstructured, semi-structured, streaming, etc. Furthermore, collected information refers to the original or raw information originally obtained from the data source(s). When security-related information is collected, it will be referred to herein as "collected security information." Example security-related information represents past, present, new, and/or evolving security threats, security threat patterns, remediation solutions, and/or security solutions. Thus, use of the term "collected security information" is understood to include information that represents, possibly among other things, past, present, new, and/or evolving security threats, security threat patterns, remediation solutions, and/or security solutions. When domain-related information is collected, it will be referred to herein as "collected domain information." Likewise, when data and architecture information is collected, it will be referred to herein as "collected data and architecture information."

In some examples, collected data and/or information (e.g., collected as described in numerous examples below) may be used to form, generate, or create a data and/or information baseline, which may be used when collecting new, updated or additional data and/or information. For example, a baseline may be used to identify new and/or updated data or information, to identify new patterns of data or information, etc.

For clarity of explanation, the following description will refer to collected information that has been extracted, classified, curated, codified, or otherwise processed as "knowledge data." Knowledge data may include any number and/or type(s) of data. Knowledge data is created to represent, for example, the actionable aspects of the underlying collected information. For example, knowledge data represents knowledge in a form that can be processed by one or more configured and trained ML models, and/or used to train one or more ML models. Knowledge data can be structured, unstructured, semi-structured, etc. When knowledge data is based upon collected security-related information, it will be referred to herein as "security knowledge data." Example security knowledge data includes codified knowledge data representing past, present, new, and/or evolving security threats, security threat patterns, remediation solutions, and/or security solutions. Thus, use of the term "security knowledge data" is understood to include codified data that represents, possibly among other things, past, present, new, and/or evolving security threats, security threat patterns, remediation solutions, and/or security solutions. When knowledge data is based upon domain-related information, it will be referred to herein as "domain knowledge data." Likewise, when knowledge data is based upon data and architecture-related information, it will be referred to herein as "data and architecture knowledge data." Example ML models may include or implement any number and/or type(s) or machine and/or artificial learning including, for example, deep-learning, reinforcement learning, model-free learning, supervised learning, unsupervised learning, inductive learning, deductive learning, transductive learning, ensemble learning, etc., and/or combinations thereof.

Information regarding remediation solutions and security solutions includes, among possibly other things, any aspects of one or more systems, apparatus, devices, methods, practices, modules, and models, for example, that can be used to implement and/or deploy remediation solutions and/or a security solutions.

Reference will now be made in detail to non-limiting examples, some of which are illustrated in the accompanying drawings.

Overview

This disclosure relates to, inter alia, ML and/or AI systems, methods, and techniques for developing security governance recommendations based upon security knowledge data representing threats, threat patterns, remediation solutions, and/or security solutions, and, more particularly, to configuring, training, and operating one or more ML models for developing security governance recommendations based upon security knowledge data.

Disclosed examples facilitate the efficient and cost effective collection of security information, and the classification, curation, integration, and codification of the collected security information into security knowledge data representing, among possibly other things, threats, threat patterns, security solutions, and/or remediation solutions that can be input to and processed by one or more ML models. Disclosed examples are scalable, and can be leveraged to develop and provide security governance recommendations for multiple and diverse clients, and various types of businesses, domains, and cloud data and system architectures to deliver secured-by-design solutions that can protect current and future computing environments from past, present, new, and/or evolving security threats.

In some examples, a user inputs or provides their current data and architecture state of a current computing environment, their current domain state, and/or their current security state, and indicates that the user wants to migrate their system to a future computing environment according a future data and architecture state, a future domain state, and/or a future security state. Disclosed example ML models can process such information to determine what, if anything, needs to change about the current computing environment and/or the future computing environment to secure them according to the future security state. The ML models can also provide a recommendation on cloud deployment options to adjust the current computing environment to comply with the future security state. In some examples, cloud deployment options are ranked and/or classified.

Example Computing Environment

FIG. 1 is a block diagram of an example computing environment 100 in which security governance recommendations can be developed based upon curated and codified security knowledge data. The example computing environment 100 includes one or more clients 102, one or more servers 104, and one or more communication networks 106.

The client(s) 102 can comprise one or more computers, which can comprise multiple, redundant, and/or replicated client computers accessible by one or more users. The client device(s) 102 can be any suitable device (e.g., a laptop, a smart phone, a tablet, a wearable device, a blade server, etc.). The client device(s) 102 include a memory and a processor for, respectively, storing and executing instructions. The memory can include one or more suitable storage media such as a magnetic storage device, a solid-state drive, random access memory (RAM), etc. A user can access the environment 100 via the client device(s) 102, to access services or other components of the environment 100 via the network(s) 106. The client(s) 102 can include one or more input devices (not depicted for clarity of illustration) that can be used by a user to enter or provide inputs. Example input devices include a keyboard, a mouse, a microphone, and a camera.

The server(s) 104 can be implemented as cloud-based servers, such as a cloud-based computing platform. For example, the server(s) 104 can be any one or more cloud-based platform(s) such as Alibaba Cloud, Amazon Web Services™ (AWS™), Google® Cloud, IBM® Cloud, Microsoft® Azure, Terraform, etc. The example server(s) 104 and/or the cloud-based servers include one or more processors 120, one or more computer memories 122, one or more network interface controllers (NICs) 124, and an electronic database 126. The NIC 124 can include any suitable network interface controller(s) that can communicate over the network(s) 106 via any suitable wired and/or wireless connection. The server(s) 104 can include one or more input devices (not depicted for clarity of illustration) that can be used by a user to enter or provide inputs (e.g., data). Example input devices include a keyboard, a mouse, a microphone, and a camera. The NIC(s) 124 can include one or more transceivers (e.g., WWAN, WLAN, and/or WPAN transceivers) functioning in accordance with IEEE standards, 3GPP, 4G, and 5G standards, or other standards, and that can be used in receipt and transmission of data via external/network ports connected to communication network(s) 106.

The example environment 100 also includes a current computing environment 108 representing a current computing environment (e.g., on-premise) of a customer, a current security state. The example environment 100 further includes a future computing environment 110 representing a future computing environment (e.g., a cloud computing environment, multi-cloud environment, etc.), a future security state, and/or a future domain state of a customer.

In some examples, the server(s) 104 perform the functionalities as discussed herein as part of a "cloud" network or can otherwise communicate with other hardware or software components within one or more cloud computing environments to send, retrieve, or otherwise analyze data or information described herein. For example, the current computing environment 108 can comprise a customer on-premise computing environment, a multi-cloud computing environment, a public cloud computing environment, a private cloud computing environment, and/or a hybrid cloud computing environment. For example, the customer can host one or more services in a public cloud computing environment (e.g., Alibaba Cloud, Amazon Web Services™ (AWS™), Google® Cloud, IBM® Cloud, Microsoft® Azure, Terraform, etc.). The public cloud computing environment can be a traditional off-premise cloud (i.e., not physically hosted at a location owned/controlled by the customer). Additionally and/or alternatively, the public cloud can be hosted on-premise at a location owned/controlled by the customer. The public cloud can be partitioned using visualization and multi-tenancy techniques, and can include one or more of the customer's IaaS and/or PaaS services.

The communication network(s) 106 are configured to communicatively couple the client(s) 102, the server(s) 104, the current computing environment 108, and/or the future computing environment 110. The network(s) 106 can comprise any suitable network or networks, including a local area network (LAN), wide area network (WAN), Internet, or combination thereof. For example, the network(s) 106 can include a wireless cellular service (e.g., 3G, 4G, 5G, etc.). Generally, the network(s) 106 enable bidirectional communication between the client device(s) 102 and the server(s) 104; the server(s) 104 and the current computing environment 108; the server(s) 104 and the future computing environment 110, etc. In some examples, network(s) 106 can comprise a cellular base station, such as cell tower(s), communicating to the one or more components of the environment 100 via wired/wireless communications based upon any one or more of various mobile phone standards, including NMT, GSM, CDMA, UMMTS, LTE, 5G, or the like. Additionally or alternatively, the network(s) 106 can comprise one or more routers, wireless switches, or other such wireless connection points communicating to the components of the environment 100 via wireless communications based upon any one or more of various wireless standards, including by non-limiting example, the IEEE 802.11x family of standards (Wi-Fi®), a Bluetooth standard, or the like.

In some examples, the current computing environment 108 comprises a private cloud that includes one or more cloud computing resources (e.g., one or more servers, one or more databases, one or more virtual machines, etc.) dedicated to the customer's exclusive use. The private cloud can be distinguished by its isolation to hardware exclusive to the customer's use. The private clouds can be located on-premise of the customer or constructed from off-premise cloud computing resources (e.g., cloud computing resources located in a remote data center). The private clouds can be third-party managed and/or dedicated clouds.

The current computing environment 108 can, additionally and/or alternatively, comprise a hybrid cloud that includes multiple cloud computing environments communicatively coupled via one or more networks (e.g., the network(s) 106). For example, in a hybrid cloud computing example, the current computing environment 108 can include one or more private clouds, one or more public clouds, a bare-metal (e.g., non-cloud based) system, etc.

The future computing environment 110 can comprise one or more public clouds, one or more private clouds, one or more bare-metal systems/servers, and/or one or more hybrid clouds.

The server(s) 104 can be implemented as one or more public clouds, one or more private clouds, one or more hybrid clouds, and/or one or more bare-metal systems/servers. For example, the server(s) 104 can be implemented as a private cloud computing environment that orchestrates the migration of a current computing environment 108 implemented as a first hybrid cloud (e.g., comprising two public clouds and three private clouds) to a future computing environment 110 implemented as a second hybrid cloud (e.g., comprising one public cloud and five private clouds).

The processor(s) 120 can include one or more suitable processors (e.g., central processing units (CPUs) and/or graphics processing units (GPUs)). The processor(s) 120 can be connected to the memory 122 via a computer bus (not depicted for clarity of illustration) responsible for transmitting electronic data, data packets, instructions, or other electronic signals to and from the processor(s) 120 to execute the machine readable instructions, methods, processes, elements or limitations, as illustrated, depicted, or described for the various flowcharts, illustrations, diagrams, figures, and/or other disclosure herein. For example, the processor(s) 120 can execute instructions stored on the memory 122 to implement, among other functions, an operating system (OS), and general or overall control of the server(s) 104. The processor 120 can interface with the database 126 via the computer bus to create, read, update, delete, or otherwise access or interact with the data stored in the database 126.

The memory 122 can include any number and/or type(s) of tangible, volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, micro SD cards, and others. The memory 122 can store an operating system (OS) (e.g., Microsoft Windows, Linux, UNIX, etc.) capable of facilitating the functionalities, apps, methods, or other software as discussed herein.

The memory 122 can store a plurality of computing modules 140, implemented as respective sets of computer-executable instructions (e.g., one or more source code libraries, trained ML models such as neural networks, convolutional neural networks, etc.) as described herein.

The database 126 can be a relational database, such as Oracle, DB2, MySQL, a NoSQL based database, such as MongoDB, or another suitable database. The database 126 can store data used to train and/or operate one or more ML models. The database 126 can store runtime data (e.g., a customer response received via the network(s) 106). In some examples, the server(s) 104 are referred to herein as "migration server(s)." The server(s) 104 can implement client-server platform technology that can interact, via the computer bus, with the memory(s) 122 (including the applications(s), component(s), API(s), data, etc. stored therein) and/or database 126 to implement or perform the machine readable instructions, methods, processes, elements or limitations, as illustrated, depicted, or described for the various flowcharts, illustrations, diagrams, figures, and/or other disclosure herein. The database 126 can be used to store collected security information and/or security knowledge data. The processor 120 can interface with the database 126 via the computer bus to create, read, update, delete, or otherwise access or interact with the data stored in the database 126.

In general, a computer program or computer based product, application, or code (e.g., the model(s), such as ML models, or other computing instructions described herein) can be stored on a computer usable storage medium, or tangible, non-transitory computer-readable medium (e.g., standard RAM, an optical disc, a universal serial bus (USB) drive, or the like) having such computer-readable program code or computer instructions embodied therein, wherein the computer-readable program code or computer instructions can be installed on or otherwise be adapted to be executed by the processor(s) 120 (e.g., working in connection with the respective operating system in the memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code can be implemented in any desired program language, and can be implemented as machine code, assembly code, byte code, interpretable source code or the like (e.g., via Golang, Python, R, C, C++, C#, Objective-C, Java, Scala, ActionScript, JavaScript, HTML, CSS, XML, etc.).

The computing modules 140 can include stored machine readable instructions, including one or more application(s), one or more software component(s), and/or one or more application programming interfaces (APIs), which can be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs can be, include, or otherwise be part of an environmental discovery, validation and automatic knowledge data generation ML model or system.

The computing modules 140 can include an ML model training module 142, comprising a set of computer-executable instructions for implementing ML training, configuration, parameterization, and/or storage functionality. The ML model training module 142 can configure, initialize, train, and/or store one or more ML models, as discussed herein. Initialized or trained ML models can be stored in the database 126, which is accessible or otherwise communicatively coupled to the processor(s) 120.

The ML training module 142 can train one or more ML models (e.g., an artificial neural network (ANN)). One or more training data sets can be used for model training in the present techniques, as discussed herein. The input data can have a particular shape that can affect the ANN network architecture. The elements of the training data set can comprise tensors scaled to small values (e.g., in the range of (−1.0, 1.0)). In some examples, a preprocessing layer can be included in training (and operation) which applies principal component analysis (PCA) or another technique to the input data. PCA or another dimensionality reduction technique can be applied during training to reduce dimensionality from a high number to a relatively smaller number. Reducing dimensionality can result in a substantial reduction in computational resources (e.g., memory and CPU cycles) required to train and/or analyze the input data.

In general, training an ANN can include establishing or configuring a network architecture or topology, adding layers including activation functions for each layer (e.g., a "leaky" rectified linear unit (ReLU), softmax, hyperbolic tangent, etc.), establishing one or more loss functions, and an optimizer. In an example, the ANN uses different activation functions at each layer, or as between hidden layers and the output layer. Example optimizers include Adam and Nadam optimizers. However, other neural network types can be chosen (e.g., a recurrent neural network, a deep learning neural network, etc.). Training data can be divided into training, validation, and testing data. For example, 20% of the training data set can be held back for later validation and/or testing. In that example, 80% of the training data set can be used for training. In that example, the training data set data can be shuffled before being so divided. Data input to the ANN can be encoded in an N-dimensional tensor, array, matrix, and/or other suitable data structure. In some examples, training can be performed by successive evaluation (e.g., looping) of the network using training labeled training samples. The process of training the ANN can cause weights or parameters of the ANN to be created. The weights can be initialized to random values. The weights can be adjusted as the network is successively trained, using one of several gradient descent algorithms to reduce loss and to cause the values output by the network to converge to expected or "learned" values. In an example, a regression can be used which has no activation function. Therein, input data can be normalized by mean centering, and a mean squared error loss function can be used, in addition to mean absolute error, to determine the appropriate loss as well as to quantify the accuracy of the outputs.

Figure 2:
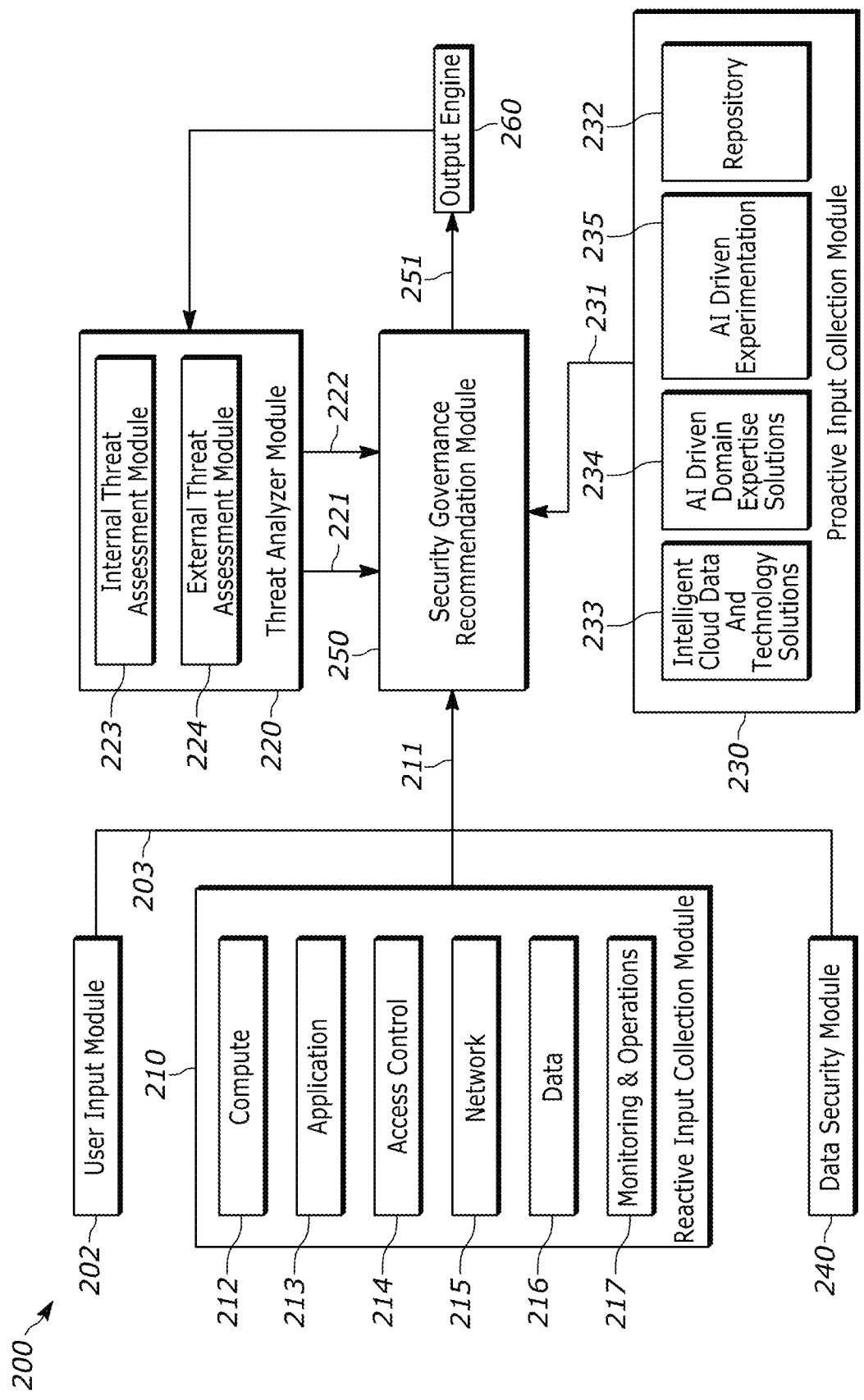
FIG. 2 is a block flow diagram depicting an example computer-implemented method for assessing security threats and making security governance recommendations, according to the disclosure.
Figure 3:
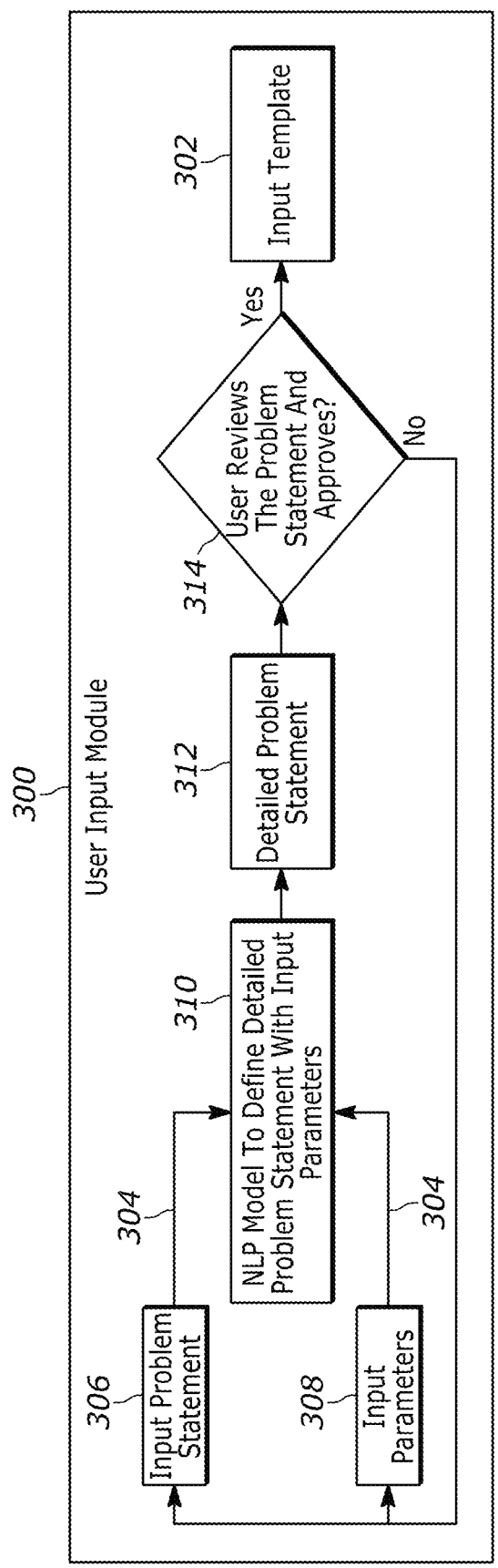
FIG. 3 is a block flow diagram depicting an example computer-implemented method for collecting user input and generating input templates, according to the disclosure.
Figure 4:
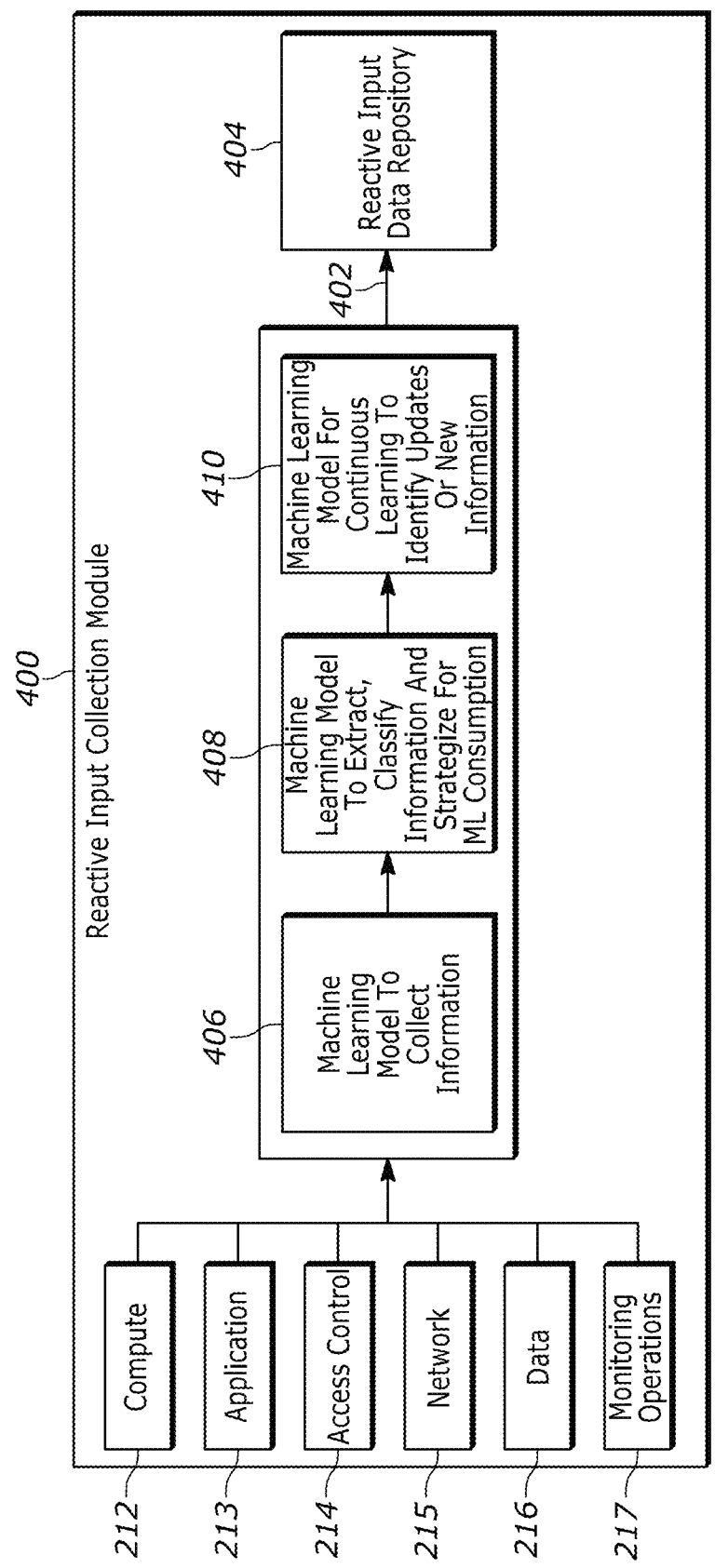
FIG. 4 is a block flow diagram depicting an example computer-implemented method for generating reactive input knowledge data, according to the disclosure.
Figure 5:
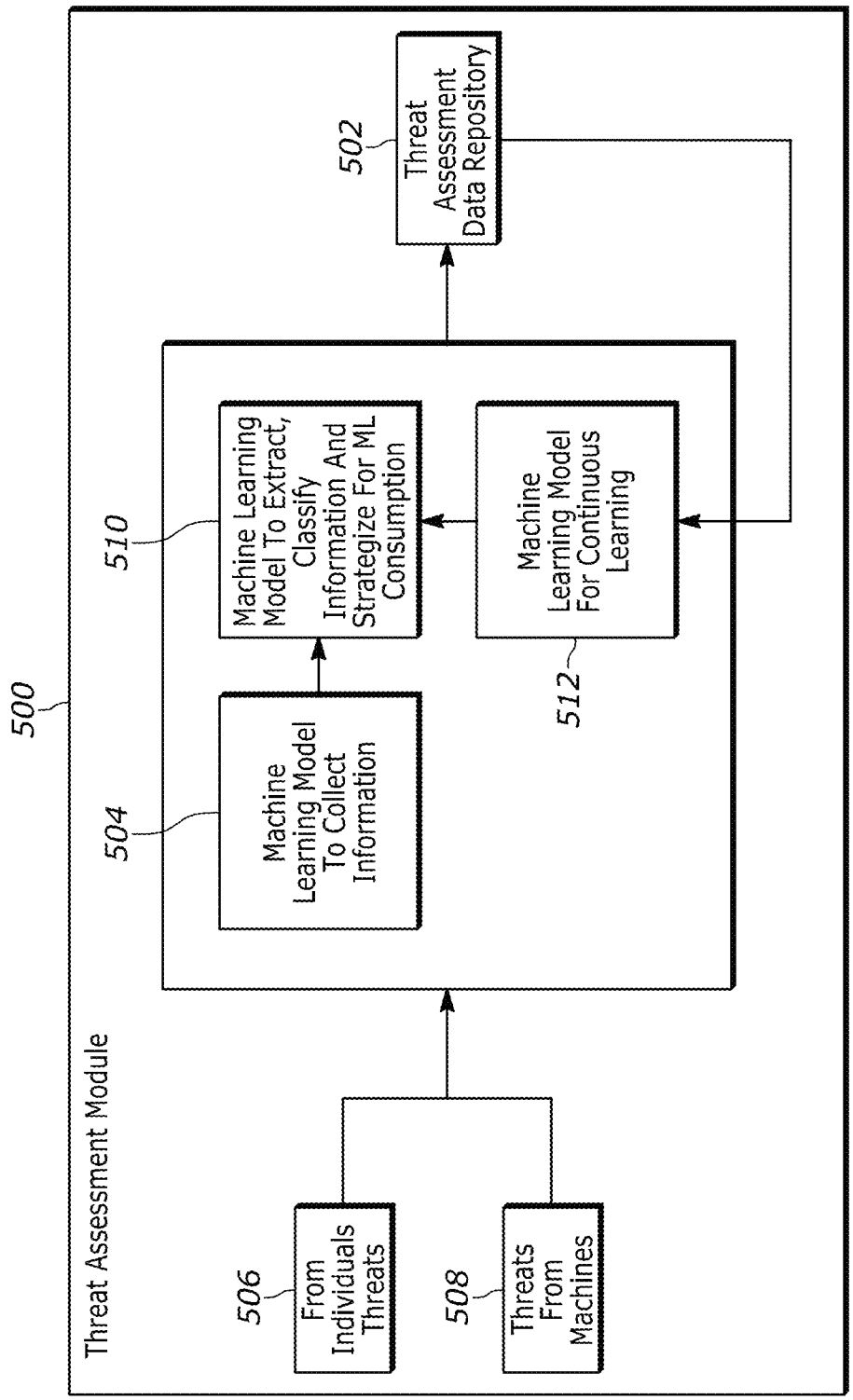
FIG. 5 is a block flow diagram depicting an example computer-implemented method for generating threat assessment knowledge data and security solutions knowledge data, according to the disclosure.
Figure 8:
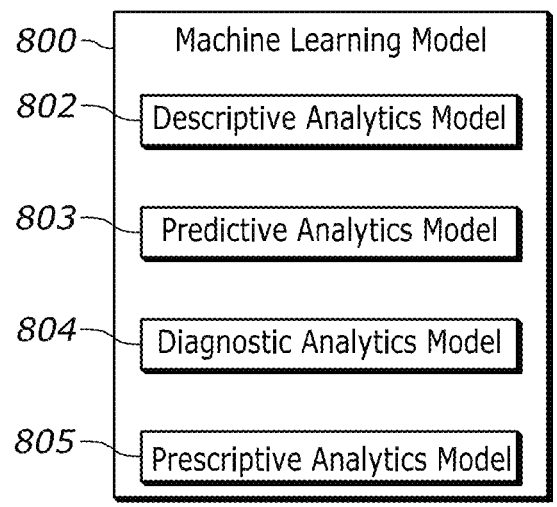
FIG. 8 is a block flow diagram depicting example ML model for assessing security threats and making security governance recommendations, according to the disclosure.
Figure 9:
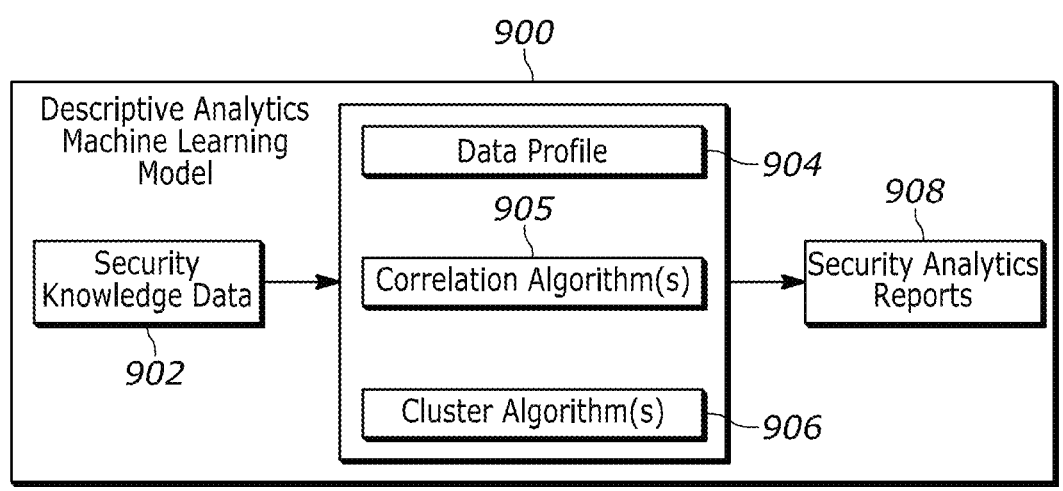
FIG. 9 is a block flow diagram depicting an example computer-implemented method for training and/or operating a descriptive analytics ML model, according to the disclosure.
Figure 10:
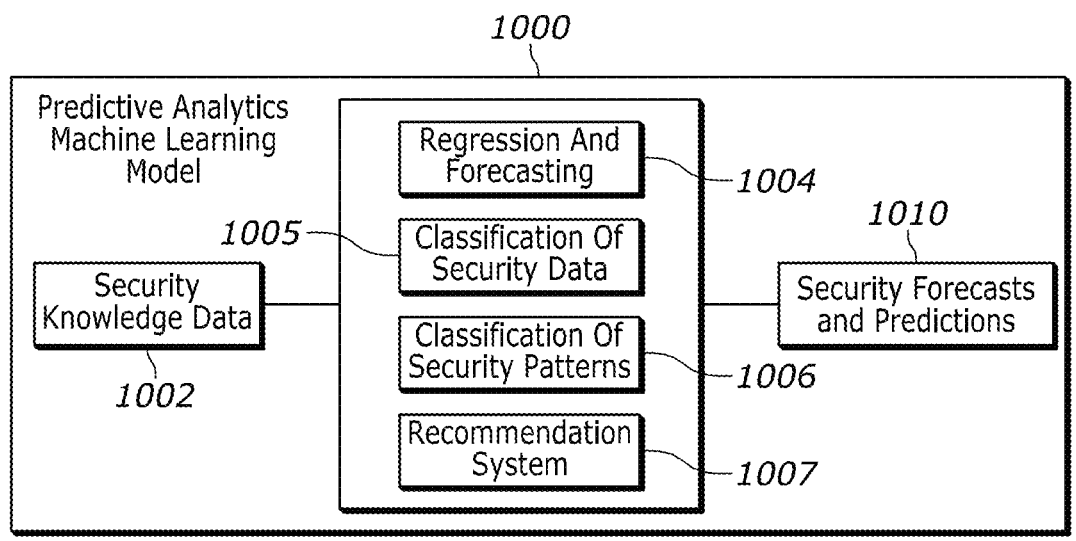
FIG. 10 is a block flow diagram depicting an example computer-implemented method for training and/or operating a predictive analytics ML model, according to the disclosure.
Figure 11:
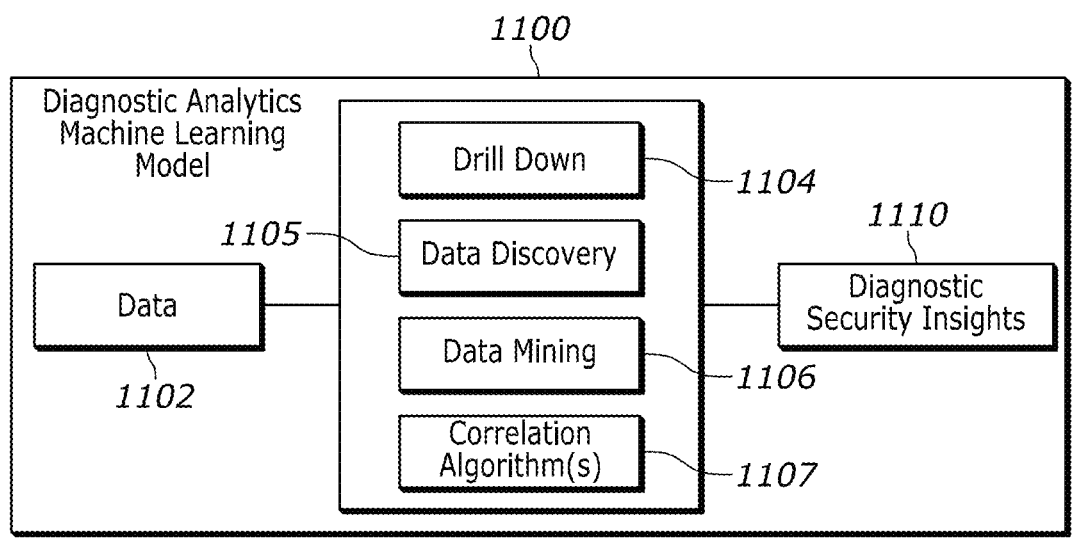
FIG. 11 is a block flow diagram depicting an example computer-implemented method for training and/or operating a diagnostic analytics ML model, according to the disclosure.
Figure 12:
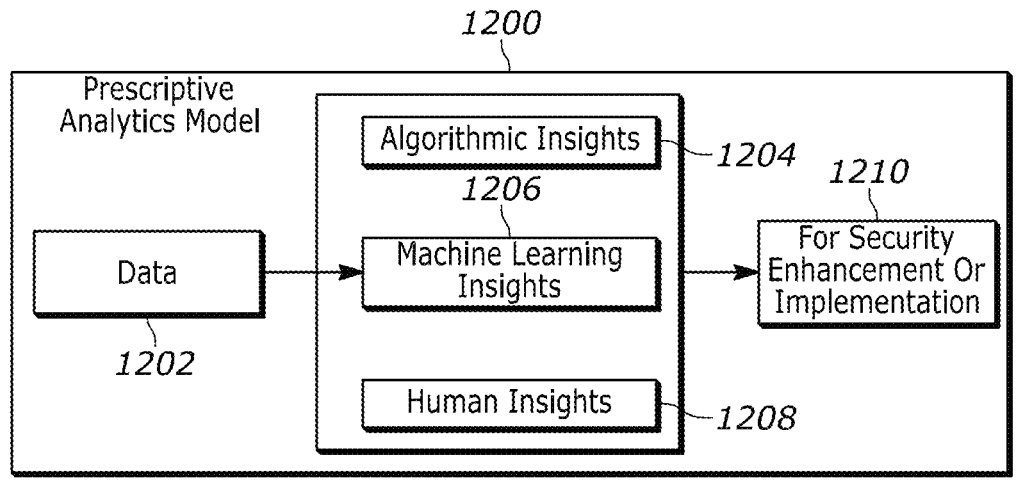
FIG. 12 is a block flow diagram depicting an example computer-implemented method for training and/or operating a prescriptive analytics ML model, according to the disclosure.

The ML training module 142 can receive labeled data at an input layer of a model having a networked layer architecture (e.g., an ANN, a convolutional neural network (CNN), etc.) for training the one or more ML models to generate ML models (e.g., ML model(s) at blocks 250 of FIG. 2, block 310 of FIG. 3, blocks 406, 408, and 410 of FIG. 4, blocks 504, 510, and 512 of FIG. 5, blocks 800-805 of FIG. 8, block 900 of FIG. 9, block 1000 of FIG. 10, block 1100 of FIG. 11, and block 1200 of FIG. 12). The received data can be propagated through one or more connected deep layers of an ML model to establish weights of one or more nodes or neurons of the respective layers. Initially, the weights can be initialized to random values, and one or more suitable activation functions can be chosen for the training process, as will be appreciated by those of ordinary skill in the art. The method can include training a respective output layer of the one or more ML models. The output layer can be trained to output a prediction, for example.

The data used to train the ANN can include heterogeneous data (e.g., textual data, image data, audio data, etc.). In some examples, multiple ANNs can be separately trained and/or operated. In some examples, the present techniques can include using an ML framework (e.g., TensorFlow, Keras, scikit-learn, etc.) to facilitate the training and/or operation of ML models.

In various examples, an ML model, as described herein, can be trained using a supervised or unsupervised ML program or algorithm. The ML program or algorithm can employ a neural network, which can be a CNN, a deep learning neural network, or a combined learning module or program that learns in two or more features or feature datasets (e.g., structured data, unstructured data, etc.) in a particular areas of interest. The ML programs or algorithms can also include natural language processing (NLP), semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other ML algorithms and/or techniques. In some examples, the AI and/or ML based algorithms can be included as a library or package executed on server(s) 104. For example, libraries can include the TensorFlow based library, the Pytorch library, and/or the scikit-learn Python library.

AN ML model can involve identifying and recognizing patterns in existing knowledge data (such as data risk issues, data quality issues, sensitive data, etc.) in order to facilitate making predictions, classifications, and/or identifications for subsequent knowledge data (such as using the models to determine or generate a classification or prediction for, or associated with, applying a data governance engine to train a descriptive analytics model).

ML model(s) can be created and trained based upon example data (e.g., "training data") inputs or data (which can be termed "features" and "labels") in order to make valid and reliable predictions for new inputs, such as testing level or production level data or inputs. In supervised ML, an ML program operating on a server or computing device can be provided with example inputs (e.g., "features") and their associated or observed outputs (e.g., "labels") in order for the ML program or algorithm to determine or discover rules, relationships, patterns, or otherwise ML "models" that map such inputs (e.g., "features") to the outputs (e.g., labels). For example, by determining and/or assigning weights or other metrics to the ML model(s) across its various feature categories. Such rules, relationships, or otherwise models can then be provided subsequent inputs in order for the ML model(s), executing on the server or computing device to predict, based upon the discovered rules, relationships, or model, an expected output.

In unsupervised learning, the ML model(s) can be required to find their own structures in unlabeled example inputs, where, for example multiple training iterations are executed by the server or computing device to train multiple generations of models until a satisfactory model, e.g., a model that provides sufficient prediction accuracy when given test level or production level data or inputs, is generated.

In supervised learning and/or unsupervised, the ML model(s) can be retrained or updated with new or different information, which can include information received, ingested, generated, or otherwise used over time. The disclosures herein can use one or both of such supervised or unsupervised ML techniques.

In various examples, training the ML models herein can include generating an ensemble model comprising multiple models or sub-models, comprising models trained by the same and/or different AI algorithms, as described herein, and that are configured to operate together. For example, in some examples, each model can be trained to identify or predict diagnostic analytics, where each model can output or determine a classification for a computing environment such that a given environment can be identified, assigned, determined, or classified with one or more environment classifications.

In some examples, the computing modules 140 can include an ML operation module 144, comprising a set of computer-executable instructions for implementing ML loading, configuration, initialization, and/or operation functionality. The ML operation module 144 can include instructions for storing trained ML models (e.g., in the electronic database 126, as a pickled binary, etc.). Once trained, the one or more trained ML model(s) can be operated in inference mode, whereupon when provided with de novo input that the model has not previously been provided, the model can output one or more predictions, classifications, etc. as described herein.

The architecture of the ML model training module 142 and the ML operation module 144 being separate modules represents advantageous improvements over the prior art. In conventional computing systems that include multiple ML algorithms for performing various functions, the models are often added to each individual module or set of instructions independent from other algorithms/modules. This is wasteful of storage resources, resulting in significant code duplication. Further, repeating ML model storage in this way can result in retraining of the same model in multiple places, wasting computational resources. By consolidating ML model training and ML model operation into two respective modules that can be reused by any of the various ML algorithms/modeling suites of the present techniques, waste of storage and computation is avoided. Further, this organization enables training jobs to be organized by a task scheduling module (not depicted), for efficiently allocating computing resources for training and operation, to avoid overloading the underlying system hardware, and to enable training to be performed using distributed computing resources (e.g., via the network(s) 106) and/or using parallel computing strategies.

In some examples, the computing modules 140 includes an input/output (I/O) module 146, comprising a set of computer-executable instructions for implementing communication functions. The I/O module 146 can include a communication component configured to communicate (e.g., send and receive) data via one or more external/network port(s) to one or more networks or local terminals, such as computer network(s) 106 and/or the client(s) 102 (for rendering or visualizing) described herein. In some examples, the server(s) 104 include a client-server platform technology such as ASP.NET, Java J2EE, Ruby on Rails, Node.js, a web service or online API, responsive for receiving and responding to electronic requests.

The I/O module 146 can further include or implement an operator interface configured to present information to a user, an administrator, and/or an operator and/or receive inputs from the user, administrator and/or operator. An operator interface can provide a display screen (e.g., via the terminal 109). The I/O module 146 can facilitate I/O components (e.g., ports, capacitive or resistive touch sensitive input panels, keys, buttons, lights, LEDs), which can be directly accessible via, or attached to, the server(s) 104 or can be indirectly accessible via or attached to the client device(s) 102. According to some examples, a user, an administrator and/or an operator can access the server(s) 104 via the client device(s) 102 to review information, make changes, input training data, initiate training via the ML training module 142, and/or perform other functions (e.g., operation of one or more trained models via the ML operation module 144).

In some examples, the computing modules 140 includes a natural language processing (NLP) module 148, comprising a set of computer-executable instructions for implementing natural language processing functionality.

In some examples, the computing modules 140 include a validation module 150, comprising a set of computer-executable instructions for implementing collecting, cataloging, and curating security knowledge data, and developing and making security governance recommendations based upon the security knowledge data. The validation module 150 can include a set of computer-implemented functionalities (e.g., one or more scripts) that determine the readiness of an existing computing system and/or security state (e.g., the current computing environment 108). For example, the validation module 150 can analyze the memory footprint of an operating system executing in the current computing environment 108, such as the services executing therein. For example, the validation module 150 can collect the amount of memory consumed, version of software, etc. The validation module 150 can include a set of instructions for training one or more ML models to evaluate input (e.g., an electronic template form describing a future computing environment and/or domain state) for validity, by analyzing one or more historical labeled inputs (e.g., a plurality of electronic template forms labeled as valid/invalid). The validation module 150 can access codified security knowledge data for training the one or more ML models. For example, disclosed example can prepare a codified knowledge data set that includes gaps in a security state definition. The validation module 150 can be provided with the codified knowledge data set, wherein the examples are labeled according to whether a component is lacking. The validation module 150 can thereby train the one or more ML models to identify electronic template forms that include gaps in a security state definition. Based upon the output of the validation module 150, the validation module 150 can generate one or more questions for the customer (e.g., is this the connection you are looking for?). A yes/no answer can be collected from the customer (e.g., via the I/O module 146) in a guided questionnaire example, for example.

In some examples, the computing modules 140 includes a template module 152, comprising a set of computer-executable instructions for implementing templating functionality. The template module 152 can generate one or more electronic template forms, which are electronic objects including a plurality of fields describing a data and architecture state, a security state, and/or a domain state (e.g., of the current computing environment 108, of the future computing environment 110, etc.). The electronic template form(s) can be used to describe the contents of an existing data and architecture state, security state, and/or domain state, for example, and to describe a non-existent but planned future data and architecture state, security state, and/or domain state. The electronic template form can comprise computer-executable code for evaluating a graphical user interface (e.g., a web browser) to provide a user with a quick and intuitive understanding of a data and architecture state, a security state, and/or a domain state.

In some examples, the computing modules 140 includes a knowledge generation module 154, comprising a set of computer-executable instructions for implementing knowledge data generation functionality. The knowledge generation module 154 can include instructions for accessing and analyzing collected security information from various internal and/or external sources (e.g., internal databases, proprietary databases, a video repository, a blog, a news repository, a webpage, a government database, a business database, etc.) and training one or more ML models based upon security knowledge data to generate one or more knowledge engines that can be one or more composite ML models, in some examples. The data obtained from the various sources can be structured data, unstructured data, semi-structured data, streaming data, etc.

Example High-Level System Flow

FIG. 2 is a block flow diagram depicting an example computer-implemented method 200 for developing security governance recommendations based upon security knowledge data representing past, present, new, and/or evolving threats, threat patterns, remediation solutions, and/or security solutions. The method 200 includes an example user input module 202 configured to generate, create, or populate one or more pre-built templates 203 based upon one or more user inputs. Example templates 203 include one or more entries representing (i) data and architecture state data representing a current data and architecture state, (ii) data and architecture state data representing a future data and architecture state (iii) domain state data representing a current domain state, (iv) domain state data representing a future domain state, (v) security state data representing a current security state, and/or (vi) security state data representing a future security state. In some examples, security state data may represent security requirements or preferences related to cryptography, blockchain, Internet of things (IoT), Internet of everything, quantum computing, or any past, current, or future technology. In some examples, security state data is based on a collection of state data. However, it may, additionally and/or alternatively, be based on evolving data or information as disclosed example systems and methods evolve and/or learn over time. In some examples, user input is provided in the form of one or more spoken or written natural language inputs, statements, phrases, etc. that can be processed with one or more NLP ML models to extract one or more parameters, etc. that are used to fill in one or more entries of the template(s). Example user inputs include goals, requirements, etc. Additionally and/or alternatively, the template(s) 203 and/or portions of thereof can be automatically populated with data obtained by electronically scanning or interrogating an existing computing environment 108 to collect information representing a current data and architecture state, a current domain state, and/or a current security state. An example user input module 300 is described below in connection with FIG. 3.

The example method 200 includes an example reactive input collection module 210 configured to collect security information from any number and/or type(s) of public data sources 212, 213, 214, 215, 216 and 217, and process the collected security information to form reactive input knowledge data 211. In some examples, the security knowledge data 211 is knowledge data representative of reported threat patterns, and/or reported remediations for different industries and/or domains. In some examples, the collected security information is obtained from the data sources 212-217 on an ongoing and continual basis, such that the reactive input knowledge data 211 reactively captures on going security-related operations, news, etc. happening in one or more industries, businesses, domains, geographic regions, etc., such that the example method 200 can react to security happenings in computing environments, security systems, etc. as they occur. Example data sources include (i) a compute data source 212, (ii) an application data source 213, (iii) an access control data source 214, (iv) a network data source 215, (v) a data source 216, and (vi) a monitoring and operations data source 217. An example reactive input collection module 400 is described below in connection with FIG. 4.

The example method 200 includes an example threat analyzer module 220 configured to collect threat and security solution information from one or more sources, and process the collected threat information to form threat assessment knowledge data 221 and security solution knowledge data 222. Example threat assessment knowledge data 221 represents identified internal and external threats. Example security solutions knowledge data 222 represents identified internal and external remediation solutions and/or security solutions. Example security threats include threats from individuals and computers. The example threat analyzer module 220 includes an internal threat assessment module 223, and an external threat assessment module 224. In the implementation shown, the internal threat assessment module 223 and the external threat assessment module 224 are substantially similar, only differing in the use of data related to internal threats vs. data related to external threats. An example threat assessment module is described below in connection with FIG. 5.

The method 200 includes an example proactive input collection module 230 configured to provide cloud deployment options 231 representing a collection of one or more building blocks that can be used to implement recommended on-premise, cloud, or hybrid computing environments, recommended computing environment transformations, and/or alternatives thereto according to user inputs, goals, requirements, etc. In some examples, the input collection module 230 is trained and/or updated over time to continually identify inefficiencies and/or improvements to computing environments. The building blocks may be provided with detailed step-by-step documents for deploying the building blocks. Additionally and/or alternative, the building blocks may be provided with code ready-to-deploy pipelines that can be executed to deploy the building blocks.

The proactive input collection module 230 includes one or more central repositories 232 of data structures, data quality and regulatory knowledge data, domain knowledge data, data governance knowledge data, global data knowledge data, data pipeline pattern knowledge data, modularized technical building blocks, pattern knowledge data, and data visualization information that may be used as part of the cloud deployment options 231. Information stored in the repository 232 can be continuously improved and/or updated based upon data collected from any number and/or type(s) of data sources such as proprietary information, engineering talent, blogs, videos, and news, to name some.

The proactive input collection module 230 includes an example intelligent cloud data and technology solutions module 233 configured to perform environmental discovery, environmental validation, and automated knowledge data generation, and more particularly, for training and operating one or more ML models to analyze current and future data and architecture state information and generate, as part of the cloud deployments options 231, infrastructure-as-code ready-to-deploy pipelines which can automatically deploy the components or building blocks based on a preferred target (e.g., on-premise or cloud platform). For example, intelligent cloud data and technologies solutions module 233 can analyze, using one or more ML models, first data representing a current data and architecture state corresponding to a current computing environment to generate a summary of one or more cloud deployment options for migrating the current computing environment to another data and architecture state. In some examples, the intelligent cloud data and technologies solutions module 233 also analyzes, using the one or more ML models, second data representing a future data and architecture state corresponding to a future computing environment to generate the summary of one or more cloud deployment options for migrating the current computing environment to the future computing environment.

Example systems that can be used to implement the intelligent cloud data and technologies solutions module 233 are described in U.S. patent application Ser. No. 17/506,521, entitled "Machine Learning Techniques for Environmental Discovery, Environmental Validation, and Automated Knowledge Repository Generation," and filed on Oct. 20, 2021; and U.S. patent application Ser. No. 17/506,536, entitled "Automated Cloud Data and Technology Solution Delivery Using Machine Learning and Artificial Intelligence Modeling," and filed on Oct. 20, 2021. U.S. patent application Ser. No. 17/506,521 and U.S. patent application Ser. No. 17/506,536 are hereby incorporated herein by reference in their entirety.

The proactive input collection module 230 includes an AI driven domain expertise solutions module 234 configured to catalog and make recommendations regarding business regulations, governance standards, rules, and policies based on domain knowledge data, as part of the cloud deployment options 231. Example systems that can be used to implement the AI driven domain expertise solutions module 234 are described in U.S. patent application Ser. No. 17/512,743, entitled "Machine Learning Methods and Systems for Cataloging and Making Recommendations based on Domain-Specific Knowledge," and filed on Oct. 28, 2021. U.S. patent application Ser. No. 17/512,743 is hereby incorporated herein by reference in its entirety.

The proactive input collection module 230 includes an AI driven experimentation module 235 configured to enable non-technical and technical users to experiment and continuously learn/deploy experiments in a computing ecosystem to foster innovation using cutting edge technologies, including contributions from internal users, and in some examples, crowdsourced users and/or open source contributors, providing a fuller picture of the available technology options than conventional systems. In some examples, the AI driven experimentation module 235 trains and operates one or more ML models to analyze an experimental data and architecture state, and generate, as part of the cloud deployments options 231, infrastructure-as-code ready-to-deploy pipelines which can automatically deploy the components or building blocks based on a preferred target (e.g., on-premise or cloud platform). Example systems that can be used to implement the AI driven experimentation module 235 are described in Indian Patent Application No. 202121056829, entitled "Artificial Intelligence-Based Use Case Model Recommendation Methods and Systems," and filed on Dec. 7, 2021. Indian Patent Application No. 202121056829 is hereby incorporated herein by reference in its entirety.

The example method 200 includes an example data security module 240 configured to secure information collected by one or more of the user input module 202, the reactive input collection module 210, the threat analyzer module 220, and/or the proactive input collection module 230, and/or knowledge data generated therefrom to ensure the integrity of the collected information, and/or knowledge data. An example data security module 700 is described below in connection with FIG. 7.

The example method 200 includes a security governance recommendation module 250 configured to analyze the knowledge data generated by one or more of the user input module 202, the reactive input collection module 210, the threat analyzer module 220, and/or the proactive input collection module 230 to develop security governance recommendations, as further described below in connection with FIGS. 8-12. By securing collected information and/or knowledge data with the security module 240, security governance recommendation module 250 can be assured to develop and provide security governance recommendations based upon legitimate knowledge data, thus, reducing the likelihood that a bad actor can corrupt the security governance recommendations made by the security governance recommendation module 250.

Generally, the security governance recommendation module 250 leverages the knowledge data to recommend one or more aspects of a security governance recommendation 251 for a future data and architecture state, a future domain state, and/or a future security state. The security governance recommendation represents a recommended set of security building blocks that can be used to implement a secured-by-design future computing environment and/or an updated current computing environment. The security governance recommendation module 250 can periodically assess the use of various security solutions, and recommend alternate security solutions. The security governance recommendation module 250 can continuously promote security innovation by pinpointing changes in security threats and/or security solutions. The security governance recommendation module 250 can also collect user feedback and systematically incorporate it in future decisions and recommendations correcting any bias that may had been introduced in the system, and detect inefficiencies, triggering opportunities for developing new reusable security building blocks.

The security governance recommendation module 250 can advantageously translate complex analysis conventionally done manually (e.g., in house) into ML data that enables the training of ML models that make security governance recommendations based upon knowledge data from clients and their objectives/needs. Further improvements provided by examples of the disclosure over conventional techniques include using the security governance recommendation module 250 not only for an initial architecture, security, and/or domain state change, but also for upkeep. Advantageously, examples of the disclosure includes ML models can help to proactively ensure the ongoing implementation of effective and efficient security solutions in the face of past, present, new, and/or evolving security threats. Examples of the disclosure represent an advantage over conventional techniques, because humans cannot keep up with the rapid pace of change in security threats, security threat patterns, remediation solutions, and/or security solutions.

Examples of the disclosure are faster than human-based techniques, at least because disclosed examples can be available 24 hours per day. Still further advantages of the disclosure include the elimination of unconscious bias toward certain security solutions. For example, security solution architects may be biased by what they have always done, what they know, and/or what they are comfortable/familiar with, whereas the security governance recommendation module 250 can reach a different outcome given the totality of collected security knowledge data. Even if a customer does not know what they want, they still benefit from bias reduction.

Some examples utilize a champion-challenger algorithm to test different competing solutions, while the solution is running. Challenging patterns and knowledge of security solutions continuously improves innovation, security, and quality of systems—the more knowledge/challenge, the better disclosed systems become. This capability is enabled by translating knowledge of security threats, threat patterns, remediation solutions, and/or security solutions into codified knowledge data that is consumable by disclosed ML models.

Recommendations of the security governance recommendation module 250 can be received at an output engine 260. Generally, the output engine 260 causes a summary of one or more aspects of a recommended security governance to be presented, display, and/or otherwise provided. In some examples, the output engine 260 can generate a recommendation as a detailed recommendation template including detailed step by step documentation and/or instructions to deploy a set of one or more aspects of the recommended security governance. In some examples, the recommendation is implemented manually. In some examples the instructions can be carried out automatically by a computing system.

Example User Input Module

FIG. 3 is a flow block diagram depicting an example computer-implemented method 300 for generating, creating, or populating one or more templates 302 based upon one or more user inputs 304. The method 300 can be used to implement the user input module 201 of FIG. 2. The user input(s) 304 can represent one or both of a problem statement 306, or one or more input parameters 308 (e.g., geography, domain, function, etc.) that represent one or more of (i) data and architecture state data representing a current data and architecture state, (ii) data and architecture state data representing a future data and architecture state (iii) domain state data representing a current domain state, (iv) domain state data representing a future domain state, (v) security state data representing a current security state, and/or (vi) security state data representing a future security state. In some examples, user input 304 is provided in the form of one or more spoken or written natural language inputs, statements, phrases, etc. Example user inputs include goals, requirements, etc. (e.g., I want a secured-by-design solution, zero trust, etc.) In some examples, a user can state a default preference (e.g., we don't care, give us the most secure security options, etc.).

At block 310, the method 300 includes one or more ML models 310 configured and trained to perform NLP on the user input(s) 304 to extract one or more parameters of a current data and architecture state, a future data and architecture state, a current domain state, a future domain state, a current security state, and/or a future security state. The ML model(s) 310 creates or generates a detailed problem statement 312 of a business and/or technology problem based on the extracted parameters that defines the requirements and/or options for a future data and architecture, domain, and/or security state. Additionally and/or alternatively, one or more portions of the detailed problem statement 312 can be automatically determined by electronically scanning or interrogating an existing computing environment to collect information representing a current computing architecture, domain state, and/or security state.

In general, NLP can be used to determine, and act upon, the meanings contained in human speech/utterances/writings/etc. For example, in some examples, NLP can be used to provide pre-filled templates. An example of the present techniques can, for example, prompt a user (e.g., the customer) to describe a future data and architecture, security, and/or domain state. The present techniques can also include instructions for identifying noncommittal speech (e.g., "we don't care," "just give us the best," etc.). The present techniques can collect and codify user speech, and use it as training data for one or more ML models to predict what kind of data and architecture, security, and/or domain state is the best. NLP-based methods improve on conventional techniques, by enabling the determination of a future data and architecture, security, and/or domain state of the customer's deployment by using ML to analyze input from engineering work and/or expert knowledge.

In some cases, a user may be unwilling and/or unable to share all current data and architecture, domain, and/or security state information. In that case, the method 300 can receive, from the user, a manually-completed template electronic form (e.g., completed by a subject matter expert) describing the current data and architecture, domain, and/or security state of the current computing environment 108. The ML model(s) 310 can analyze the received manually-completed template to ensure that the template reflects a comprehensive architecture, domain, and/or security state. The ML model(s) 310 can convert knowledge artifacts into codified data that can be ingested by one or more ML models, enabling the ML model(s) to determine whether there is a complete view of the customer's future architecture, security, and/or domain state, and if not, to confirm missing gaps.

At block 314, a user can provide feedback on the detailed problem statement 312. If, at block 314, the user approves or indicates that the detailed problem statement 312 reflects their requirements, the method 300 fills in entries of the template(s) 302 based upon the extracted parameters and the detailed problem statement 312. In some examples, the template(s) 302 are based on one or more pre-determined templates. If the user does not approve the detailed problem statement 312, the method can return to block 310 to receive additional and/or alternative user input(s).

Example Reactive Input Collection Module

FIG. 4 is a flow block diagram depicting an example computer-implemented method 400 for collecting, categorizing, curating, and codifying collected security-related information to form reactive input knowledge data 402 stored in a reactive input data repository 404. The method 400 can be used to implement the example reactive input collection module 210 of FIG. 1. The data 402 can relate to ongoing security-related operations, news, reported threats, reported remediations, etc. for various different industries, businesses, domains, geographic areas, etc., such that the example security governance recommendation module 250 can react, based on the reactive input knowledge data 402, to security happenings in computing environments, security systems, etc. as they occur (e.g., in near real-time).

At block 406, the method 400 uses one or more configured and trained ML models 406 to collect security-related information from any number and/or type(s) data sources (e.g., internal databases, proprietary databases, a video repository, a blog, a news repository, a webpage, a government database, a business database, the example data sources 212-217, etc.). Collecting the information can include receiving/retrieving, in parallel and/or serially, security data from a plurality of internal and/or external data sources. The collected information can be structured, unstructured, semi-structured, streaming, etc. In some examples, the collected information can be analyzed and used to train the one or more ML models 404. For example, with reference to FIG. 1, the ML training module 142 can retrieve and use the collected data to train the one or more ML model(s) 406 to recognize or identify security data.

At block 408, the method 400 uses one or more configured and trained ML models 408 to extract, classify, curate, and codify the collected information, or artifacts thereof, from the data collected by the ML model(s) 402 into codified reactive input knowledge data 402, which can be processed by the security governance recommendation module 250. The ML model(s) 408 can be used to determine the type of data, e.g., by training the ML model(s) 408 using labeled historical data (e.g., a group of files labeled by type or format). The ML training module 142 can train the ML model(s) 408 to analyze the collected information to extract examples of and classify security knowledge data based upon data type and/or source for subsequent ML model consumption.

At block 410, the method 400 uses one or more configured and trained ML models 410 to continuously learn security knowledge data based upon updated and/or new knowledge data made available from the data sources. The ML model(s) 410 can also learn to identify efficiencies of past security solutions, propose alternative security solutions, etc.

The ML models 406, 408, and 410 can be self-learning and extract security-related knowledge information from different data sources, data types/formats, etc. The method 400 can continuously ingest information from the various data sources, and feed the information into the various ML models 406, 408, and 410.

In some examples, the ML models 406, 408, and 410 are combined into a data structure engine composed of one or more of the ML models 406, 408, and 410. Additionally and/or alternatively, the ML models 406, 408, and 410 can be combined as multiple layers of a single ML model (e.g., of an ANN). In that case, data can be passed to a first 1 . . . n layers corresponding to the ML model(s) 406, then to a second n+1 . . . m layers corresponding to the ML model(s) 408, and so on. Ultimately, output of the layers can correspond to curated and codified reactive input knowledge data 402. The particular combination of the ML models 406, 408, and 410 can vary in practice. The ML models 406, 408, and 410 can be trained, for example, using ensemble techniques, transfer learning, and deep learning techniques, as will be appreciated by those of ordinary skill in the art. Further, in some examples, the method 400 can include more or fewer ML models than those used blocks 406, 408, and 410.

It will be appreciated by those of ordinary skill in the art that training of the ML models 406, 408, and 410, and/or operations of the method 400 can be performed in serial/sequential order and/or in parallel, in some examples, depending on, for example, curation and/or sanitization needs, requirements, etc. For example, the ML model(s) 406 can be trained before the ML model(s) 408 are trained. In some examples, output from the trained ML model(s) 406 can be passed to the ML model(s) 408. In some examples, one or more of the ML models 406, 408, and 410 can be used in an inference mode, wherein the output of first ML model(s) is passed to other ML model(s) to generate additional inferences.

Example Threat Assessment Module

FIG. 5 is a flow block diagram depicting an example computer-implemented method 500 for assessing internal and external threats and security solutions. The method 500 can be used to implement the internal threat assessment module 223, the external threat assessment module 224, and/or, more generally, the threat analyzer module 220 of FIG. 2. The method 500 can be used to collect and process information representative of at least one of past security threat patterns, present security threat patterns, new security threat patterns, and/or evolving security threat patterns into threat assessment knowledge data stored in a threat knowledge data repository 502. The method 500 can also be used to collect and process security solution information representative of at least one of past security solutions, present security solutions, new security solutions, and/or evolving security solutions into security solutions knowledge data stored in the threat knowledge data repository 502.

At block 504, the method 500 uses one or more configured and trained ML models 504 to collect information representative of threats and/or threat patterns, and/or security or remediation solutions from any number and/or type(s) of information data sources 506 and 508 containing information relevant to threats of threat patterns, and/or security or remediation solutions. In some examples, the method 500 collects information related to (i) new, upcoming, and/or future technologies, (ii) threat and/or threat patterns associated with such technologies, and/or (iii) security or remediation solutions thereto, thus, enabling disclosed methods and systems to learn and be aware of technological developments, risk developments, and changing security requirements. In some examples, information collected from the data source 506 relates to threats from individuals, and the data source 508 relates to threats from machines. In some examples, the data source 508 represents security information from network edge nodes, websites, blogs, etc. where data is constantly flowing between machines, networks, and systems. When the method 500 is assessing internal threats and remediation solutions, the data sources 506 and 508 can be selected to contain threat or threat pattern information, and/or security or remediation solutions information relevant to internal threats. Likewise, when the method 500 is assessing external threats and remediation solutions, the data sources 506 and 508 can be selected to contain threat or threat pattern information, and/or security or remediation solutions information relevant to external threats. While two data sources 506 and 508 are shown in FIG. 5, any number and/or type(s) of additional and/or alternative data sources may be used. The collected information can be structured, unstructured, semi-structured, streaming, etc. In some examples, the collected information is used to train the one or more ML models 504. For example, with reference to FIG. 1, the ML training module 142 can retrieve and use the collected information to train the one or more ML model(s) 504 to recognize or identify information relevant to security threats and/or threat patterns, and/or security or remediation solutions. In some examples, the ML model(s) 504 rank or otherwise prioritize the collected information.

At block 510, the method 500 uses one or more configured and trained ML models 510 to extract, classify, curate, and codify threat or threat pattern information, and/or security or remediation solutions information, or artifacts thereof, collected by the ML model(s) 504 into threat assessment knowledge data and security solution knowledge data, respectively, that can be stored in the repository 502. The ML model(s) 510 can be trained using labeled knowledge data, for example. The ML training module 142 can train the ML model(s) 510 to analyze the knowledge data to extract examples of and classify threat or threat pattern data, and/or security or remediation solutions data based upon data type and/or source for subsequent ML model consumption. In some examples, the ML model(s) 510 rank or otherwise prioritize the knowledge data.

At block 512, the method 500 uses one or more configured and trained ML models 510 to continuously learn security knowledge data based upon updated and/or new information made available from the data sources 506 and 508. The ML model(s) 512 can be configured and trained to learn to identify efficiencies of past security solutions, propose alternative security solutions, etc. The ML model(s) 512 can also be configured and trained to learn to assess the successes and/or failures of prior security solutions as lessons learned. As a result of such training, the ML model(s) 512 can learn to identify and track new and/or evolving threats. In some examples, the ML model(s) 512 rank or otherwise prioritize the continuously learned security knowledge data.

The ML models 504, 510, and 512 can be self-learning and extract security-related knowledge information from different data sources, data types/formats, etc. The method 500 can continuously ingest information from the various data source(s) to form new or updated knowledge data, and feed the knowledge data into the various ML models 504, 510, and 512.

In some examples, the ML models 504, 510, and 512 are combined into a data structure engine composed of one or more of the ML models 504, 510, and 512. Additionally and/or alternatively, the ML models 504, 510, and 512 can be combined as multiple layers of a single ML model (e.g., of an ANN). In that case, data can be passed to a first 1 . . . n layers corresponding to the ML model(s) 504, then to a second n+1 . . . m layers corresponding to the ML model(s) 510, and so on. Ultimately, output of the layers can correspond to curated and codified threat or threat knowledge data and/or security solutions knowledge data stored in the repository 502. The particular combination of the ML models 504, 510, and 512 can vary in practice. The ML models 504, 510, and 512 can be trained, for example, using ensemble techniques, transfer learning, and deep learning techniques, as will be appreciated by those of ordinary skill in the art. Further, in some examples, the method 500 can include more or fewer ML models than those shown in FIG. 5.

It will be appreciated by those of ordinary skill in the art that training of the ML models 504, 510, and 512, and/or operations of the method 500 can be performed in serial/sequential order and/or in parallel, in some examples, depending on, for example, curation and/or sanitization needs, requirements, etc. For example, the ML model(s) 504 can be trained before the ML model(s) 510 are trained. In some examples, output from the trained ML model(s) 504 can be passed to the ML model(s) 510. In some examples, one or more of the ML models 504, 510, and 512 can be used in an inference mode, wherein the output of first ML model(s) is passed to other ML model(s) to generate additional inferences.

Example Data Privatization Module

Figure 6:
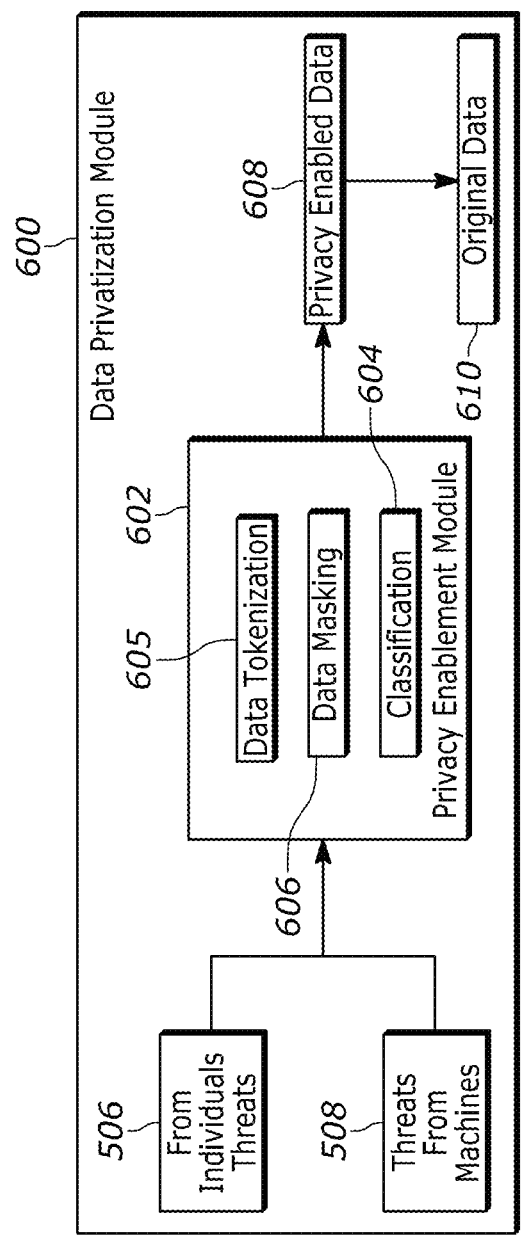
FIG. 6 is a block flow diagram depicting an example computer-implemented method for privatizing collected information and knowledge data, according to the disclosure.

FIG. 6 is a flow block diagram depicting an example computer-implemented method 600 for privatizing collected information and/or knowledge data. The method 600 can be used to implement the ML model(s) 504 of FIG. 5. While the example method 600 is shown in the context of FIG. 5, the method 600 can be likewise used to privatize information collected by and/or knowledge data formed by the ML model(s) 406 of FIG. 4.

At block 602, the method 600 uses a privacy enablement module 602 configured to process collected information and/or knowledge data collected by and/or formed by the ML model(s) 504 from the data sources 506 and 508 to classify and/or protect the privacy of the collected information and/or the knowledge data. The privacy enablement module 602 includes one or more ML models 604 configured and trained to classify the collected information and/or knowledge data based upon its importance, relevance and/or completeness, for example, one or more ML models 605 configured and trained to tokenize the collected information and/or the knowledge data, and one or more ML models 606 configured and trained to identify and mask sensitive information and/or knowledge data to generate privacy enabled data 608. In some examples, the originally collected information or original knowledge data can be retained as original data 610, which can be retrieved when appropriate and according to applicable security or governance constraints.

The ML models 604-606 can self-learn to classify, tokenize and mask information collected from any number and/or type(s) of data sources, data types/formats, etc. In some examples, the ML models 604-606 are combined into a data structure engine composed of one or more of the ML models

604-606. Additionally and/or alternatively, the ML models 604-606 can be combined as multiple layers of a single ML model (e.g., of an ANN). In that case, data can be passed to a first 1 . . . n layers corresponding to the ML model(s) 604, then to a second n+1 . . . m layers corresponding to the ML model(s) 605, and then to a third n+1 . . . m layers corresponding to the ML model(s) 606. Ultimately, output of the layers can correspond to the privacy enabled data 608. The particular combination of the ML models 604-606 can vary in practice. The ML models 604-606 can be trained, for example, using ensemble techniques, transfer learning, and deep learning techniques, as will be appreciated by those of ordinary skill in the art. Further, in some examples, the method 600 can include more or fewer ML models than those used blocks 604-606.

It will be appreciated by those of ordinary skill in the art that training of the ML models 604-606, and/or operations of the method 600 can be performed in serial/sequential order and/or in parallel, in some examples, depending on, for example, curation and/or sanitization needs, requirements, etc. For example, the ML model(s) 606 can be trained before the ML model(s) 604 and 605 are trained. In some examples, output from the trained ML model(s) 604 can be passed to the ML model(s) 605 or 605. In some examples, one or more of the ML models 604-606 can be used in an inference mode, wherein the output of first ML model(s) is passed to other ML model(s) to generate additional inferences.

Example Data Security Module

Figure 7:
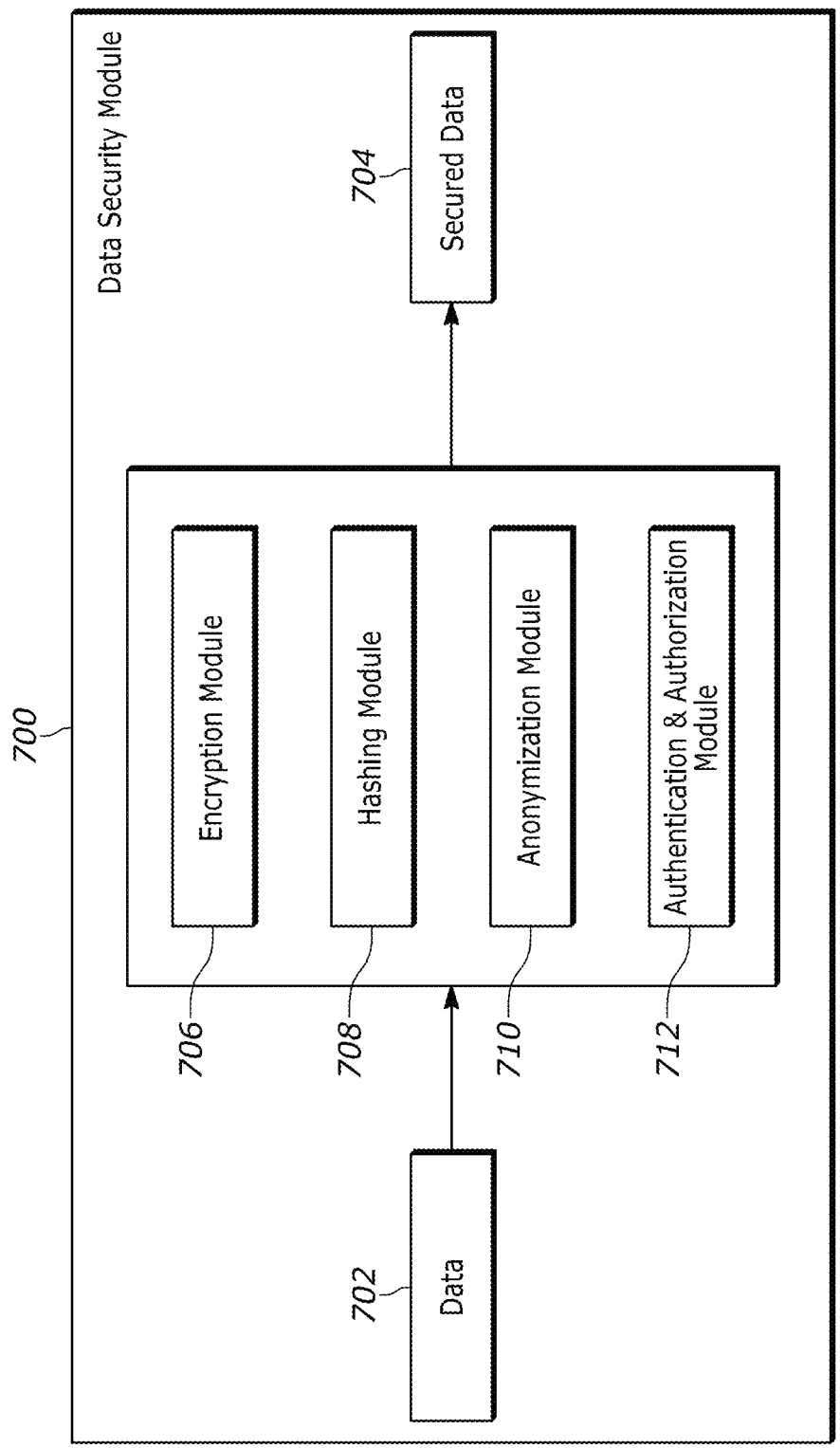
FIG. 7 is a block flow diagram depicting an example computer-implemented method for securing collected information and knowledge data, according to the disclosure.

FIG. 7 is a flow block diagram depicting an example computer-implemented method 700 for securing collected information and/or knowledge data 702. By securing the collected information and/or the knowledge data 702, the security governance recommendation module 250 can be assured to develop and provide security governance recommendations based upon legitimate knowledge data, thus, reducing the likelihood that a bad actor can corrupt the security governance recommendations made by the security governance recommendation module 250. The collected information and knowledge data 702 can be collected by one or more of the user input module 202, the reactive input collection module 210, the threat analyzer module 220, and/or the proactive input collection module 230.

The method 700 includes an encryption module 706 configured to encrypt and decrypt collected information and/or knowledge data 702, a hashing module 708 configured to compute cryptographic hashes of collected information and/or knowledge data 702, an anonymization module 710 to anonymize collected information and/or knowledge data 702 to enhance data privacy, and/or an authentication and authorization module 712 configured to control access to the secured information and/or knowledge data 702. While four modules 706, 708, 710, and 712 are shown in FIG. 7, a data security module can contain any number and/or type(s) of additional and/or alternative modules configured to secure data. Moreover, in some examples, not all of the modules 706, 708, 710, and 712 are implemented. While the modules 706, 708, 710, and 712 are shown in parallel, they can be arranged in other ways. For example, the authentication and authorization module 712 can use a cryptographic hash computed by the hashing module 708 to verify the authenticity of collected information and/or knowledge data, and/or can use the encryption module 706 to decrypt encrypted collected information and/or knowledge data based upon a private-public key pair.

Example Machine Learning Models

FIG. 8 is an example block diagram of example ML model 800 that can configured and trained to implement the example security governance recommendation module 250 of FIG. 2. The ML model 800 includes one or more descriptive analytics ML models 802, one or more predictive analytics ML models 803, one or more diagnostic analytics ML models 804, and/or one ore prescriptive analytics ML models 805. In some examples, more, fewer and/or different ML models are included. The ML models 802-805 can be configured and trained as discussed herein (e.g., by the ML training module 142 of FIG. 1) and operated as discussed herein (e.g., by the ML operation module 144). The training and operation of the models 802-805 is discussed in detail, below.

Example Descriptive Analytics Model

FIG. 9 is an exemplary block flow diagram depicting an example computer-implemented method 900 for training and/or operating one or more descriptive analytics ML models (e.g., the descriptive analytics model(s) 802), and/or, more generally, the security governance recommendation module 250 of FIG. 2. Knowledge data from various sources can be analyzed in method 900 to understand what security solutions have been used in the past via profiling, identifying patterns, and analyzing correlations between profiling knowledge data and outcomes, and by clustering the security solutions based on different features (e.g., different security threats and/or threat patterns).

The method 900 includes receiving/retrieving security knowledge data at block 902. The knowledge data 902 can include the security knowledge data generated by one or more of the user input module 202, the reactive input collection module 210, the threat analyzer module 220, and/or the proactive input collection module 230.

The method 900 includes analyzing the knowledge data 902 at blocks 904, 905, and 906. At block 904, the method 900 analyzes the knowledge data 902 to profile, for example, what security threats and/or threat patterns have been encountered in the past, and/or what remediation and/or security solutions have been used in the past and their outcomes. At block 905, the method 900 analyzes knowledge data (e.g., historical knowledge data) to identify correlations between the knowledge data and outcomes. At block 906, the method 900 analyzes knowledge data (e.g., historical knowledge data) to (e.g., using unsupervised ML) identify one or more clusters in the knowledge data 902. The method 900 can include generating one or more security analytics reports at block 908. The reports can include information identified at the blocks 904-906, for example. In some examples, more, fewer and/or different modules 904-906 are included.

Example Predictive Analytics Model

FIG. 10 is an exemplary block flow diagram depicting an example computer-implemented method 1000 for training and/or operating one or more predictive analytics ML models (e.g., the predictive analytics model(s) 803), and/or, more generally, the security governance recommendation module 250 of FIG. 2. Knowledge data from various sources can be analyzed in method 1000 to predict future security outcomes. In operation, the method 1000 can also be used to predict and forecast frequency of updates and volumes of updates.

The method 1000 includes receiving/retrieving security knowledge data at block 1002. The knowledge data 1002 can include the security knowledge data generated by one or more of the user input module 202, the reactive input collection module 210, the threat analyzer module 220, and/or the proactive input collection module 230.

The method 1000 includes analyzing the knowledge data 1002 at blocks 1004, 1005, 1006, and 1007. At block 1004, the method 1000 performs a regression and/or forecasts a frequency of updates to security threats, security threat patterns, remediation solutions, and/or security solutions. At block 1005, the method 1000 includes classifying security threats, security threat patterns, remediation solutions, and/or security solutions into one or more categories (e.g., as a classification, a multi-class classification, etc.). At block 1006, the method 1000 includes classifying patterns in the security threats, and/or remediation and/or security solutions. At block 1007, the method 1000 includes a recommendation system. The method 1000 stores outcomes determined by the blocks 1004-1008 as security forecasting predictions 1010. In some examples, more, fewer and/or different ML models 1004-1007 are included.

Example Diagnostics Analytics Model

FIG. 11 is a block flow diagram depicting an example computer-implemented method 1100 for training and/or operating a diagnostic analytics ML model (e.g., the diagnostic analytics model of block 804), and/or, more generally, the security governance recommendation module 250 of FIG. 2. Data from various sources can be analyzed in the method 1100 to understand what has occurred in a running system by drilling down into the data, performing data discovery, performing data mining, and/or correlating data.

The method 1100 includes receiving/retrieving at block 1102 i) data from one or more descriptive ML models (e.g., the one or more ML models trained by the method 900), (ii) data from one or more predictive ML models (e.g., the one or more ML models trained by the method 1000), (iii) knowledge data collected, curated, and codified by one or more of the user input module 202, the reactive input collection module 210, the threat analyzer module 220, and/or the proactive input collection module 230, (iv) data representing a current architecture, security, and/or domain state, and/or (v) data representing a future architecture, security and/or domain state. The data at block 1102 can include descriptive and/or prescriptive inferences that can be processed at blocks 1104, 1105, 1106, and 1107 using various approaches.

The method 1100 includes drilling down into the data 1102 at block 1104, performing data discovery on the data 1102 at block 1105, performing data mining on the data 1102 at block 1106, and/or performing data correlation on the data 1102 at block 1107. In some examples, more, fewer and/or different modules 1104-1107 are included. For example, inferences can be analyzed using an algorithmic approach to codify what has happened with past groupings of remediation and/or security solutions, using ML insights, and/or using human insight.

The blocks 1104-1107 can generate respective summaries of diagnostic security insights for next best actions (i.e., one or more recommended actions) at block 1110.

Example Prescriptive Analytics Model

FIG. 12 is a block flow diagram depicting an example computer-implemented method 1200 for training and/or operating a prescriptive analytics ML model (e.g., the prescriptive analytics model of block 805), and/or, more generally, the security governance recommendation module 250 of FIG. 2. Data from various sources can be analyzed in the method 1200 to generate one or more prescriptions to showcase the next best set of security governance recommendations to be complied with based on the data from descriptive, predictive, and/or diagnostic ML models. The method 1200 can use a blend of algorithmic knowledge, insights generated from ML models, and/or human insights, for example.

Generally, the prescriptive analytics ML model 1200 enables a customer and a proprietor of the current security solutions to reflect on all security knowledge data by analyzing, for example, options from reinforcement learning, classification, and time to market/cost/frequency models.

The method 1200 can include, at block 1202, receiving/retrieving (i) data from one or more descriptive ML models (e.g., the one or more ML models trained by the method 900), (ii) data from one or more predictive ML models (e.g., the one or more ML models trained by the method 1000), (iii) data from one or more diagnostic ML models (e.g., the one or more ML models trained by the method 1100), (iv) knowledge data collected, curated, and codified by one or more of the user input module 202, the reactive input collection module 210, the threat analyzer module 220, and/or the proactive input collection module 230, (v) data representing a current architecture, security, and/or domain state, and/or (vi) data representing a future architecture, security and/or domain state. The data at block 1202 can include descriptive and/or prescriptive inferences that can be processed at blocks 1204, 1205, and 1206 using various approaches.

The method 1200 analyzes inferences using an algorithmic approach at block 1204, using ML insights at block 1205, and/or using human insights at block 1206 to codify what has happened with past groupings of security knowledge data. The blocks 1204-1206 can generate respective summaries of remediation and/or security solutions for next best actions (i.e., one or more recommended actions) at block 1210. In some examples, more, fewer and/or different ML models 1204-1206 are included.

Example Output Engine

Figure 13:
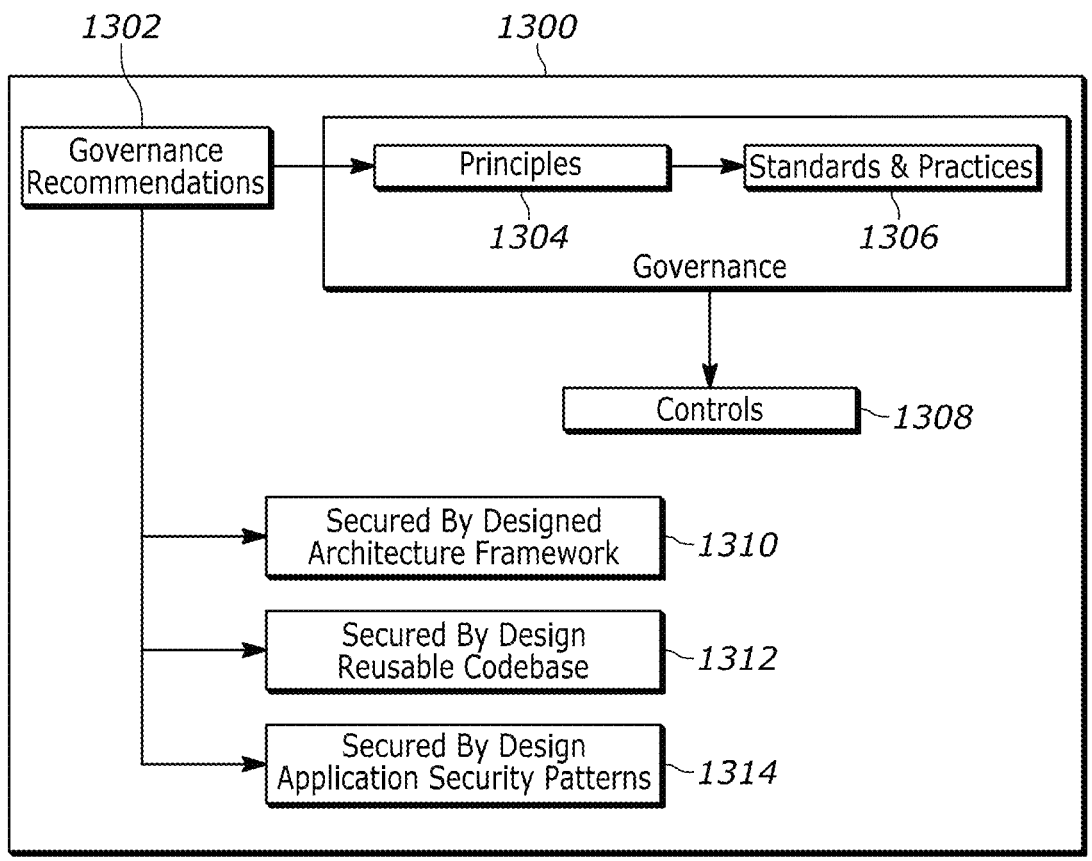
FIG. 13 is a block flow diagram depicting an example computer-implemented output engine method, according to the disclosure.

FIG. 13 is a block flow diagram depicting an example computer-implemented method 1300 for providing, displaying, and/or presenting aspects of security governance recommendations 1302 (e.g., made by one or more of the security governance recommendation module 250, and the MI model(s) 800, 900, 1000, 1100, and 1200). The method 1300 can be used to implement the output engine 260 of FIG. 2. Security governance recommendations 1302 could be at a local, central, and/or location, and/or combinations thereof, depend upon, for example, user configuration.

The method 1300 analyzes the security governance recommendations 1302 to develop or generate security operations and/or implementation information. The security operations and/or implementation information can include security solution principles 1304, security solutions standards and practices 1306, and/or security controls 1308 that can be implemented in a secured-by-design computing environment according to a desired security state. In some examples, some or all of the security solution principles 1304, the security solutions standards and practices 1306, and/or the security controls 1308 can be provided as infrastructure-as-code ready-to-deploy pipelines that can be automatically deployed to implement a secured-by-design computing environment that complies with a desired security state, and/or to update a computing environment to comply with the desired security state. Additionally and/or alternatively, some or all of the security solution principles 1304, the security solutions standards and practices 1306, and/or the security controls 1308 can be provided as templates, documents, instructions, etc. that can be used to implement or deploy a secured-by-design computing environment that complies with a desired security state, and/or to update a computing environment to comply with the desired security state. In some examples, the method 1300 also classifies and/or ranks the security governance recommendations 1302 while developing or generating security operations and/or implementation information. Additionally and/or alternatively, the method 1300 may classify and/or rank the security solution principles 1304, security solutions standards and practices 1306, and/or security controls 1308.

Additionally and/or alternatively, the method 1300 analyzes the security governance recommendations 1302 to create, maintain, or update one or more living documents or manuals that a security professional can use, consult, refer to, etc. when designing or implementing a security solution for a computing environment that complies with a desired security state, and/or when updating a computing environment to comply with the desired security state. Example living documents or manuals include: (i) a document or manual 1310 containing secured-by-design architecture framework information, (ii) a document or manual 1312 containing a secured-by-design reusable codebase that can be used to secure a computing environment, and (iii) a document or manual 1314 containing secured-by-design application security patterns.

Exemplary Computer-Implemented Continuous Deployment Methods

As noted, the methods disclosed herein can continuously retrain one or more ML models and update a set of security governance recommendations to be complied with based on new predictive outcomes. For example, one or more of the user input module 202, the reactive input collection module 210, the threat analyzer module 220, and/or the proactive input collection module 230 can be continuously updated. In an example, the method periodically (depending upon the user preference, e.g., quarterly, every 6 months, every year etc.) monitors the current landscape of threats and security solutions for changes, upcoming changes, etc. and updates a recommended set of security governance recommendations to be complied with.

Additional Considerations

With the foregoing, users whose data is being collected and/or utilized can first opt-in. After a user provides affirmative consent, data can be collected from the user's device (e.g., a mobile computing device). In other examples, deployment and use of neural network models at a client or user device can have the benefit of removing any concerns of privacy or anonymity, by removing the need to send any personal or private data to a remote server.

The following additional considerations apply to the foregoing discussion. Throughout this specification, plural instances can implement operations or structures described as a single instance. Although individual operations of one or more methods are illustrated and described as separate operations, one or more of the individual operations can be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like can refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one example," "one example" or "an example" means that a particular element, feature, structure, or characteristic described in connection with the example is included in at least one example. The appearances of the phrase "in one example," "one example" or "an one example" in various places in the specification are not necessarily all referring to the same example.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the examples herein. This is done merely for convenience and to give a general sense of the description. This description, and the claims that follow, should be read to include one or at least one and the singular also includes the plural unless it is obvious that it is meant otherwise.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Additionally, certain examples are described herein as including logic or a number of routines, subroutines, applications, or instructions. These can constitute either software (e.g., code embodied on a machine-readable medium) or hardware. In some examples, the code includes low code/no code visualizations to visualize, discover and generate insights with or without coding skills. For example, a what you see is what you get (WYSIWYG) visualization tool may used to generate visualizations. However, visualizations can generated using more complex tools (e.g., visualization libraries such as Matplotlib, D3, etc.). Additionally and/or alternatively, viewing or implement the code may require coding skills. In hardware, the routines, etc., are tangible units capable of performing certain operations and can be configured or arranged in a certain manner. In example examples, one or more computer systems (e.g., a standalone, client or server computer system) or one or more hardware modules of a computer system (e.g., a processor or a group of processors) can be configured by software (e.g., an application or application portion) as a hardware module that operates to perform certain operations as described herein.

In various examples, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In examples in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory product to which it is communicatively coupled. A further hardware module can then, at a later time, access the memory product to retrieve and process the stored output. Hardware modules can also initiate communications with input or output products, and can operate on a resource (e.g., a collection of information).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., code in the form of, for example, software and/or firmware, low code/no code visualizations of code) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example examples, comprise processor-implemented modules.

Similarly, the methods or routines described herein can be at least partially processor-implemented. For example, at least some of the operations of a method can be performed by one or more processors or processor-implemented hardware modules. The performance of certain of the operations can be distributed among the one or more processors, not only residing within a single machine, but deployed across a number of machines. In some example examples, the processor or processors can be located in a single location (e.g., within a building environment, an office environment or as a server farm), while in other examples the processors can be distributed across a number of locations.

The performance of certain of the operations can be distributed among the one or more processors, not only residing within a single machine, but deployed across a number of machines. In some example examples, the one or more processors or processor-implemented modules can be located in a single geographic location (e.g., within a building environment, an office environment, or a server farm). In other example examples, the one or more processors or processor-implemented modules can be distributed across a number of geographic locations.

Some examples can be described using the expression "coupled" and "connected" along with their derivatives. For example, some examples can be described using the term "coupled" to indicate that two or more elements are in direct physical or electrical contact. The term "coupled," however, can also mean that two or more elements are not in direct contact with each other, but yet still co-operate or interact with each other. The examples are not limited in this context.

Upon reading this disclosure, those of skill in the art will appreciate still additional alternative structural and functional designs for the method and systems described herein through the principles disclosed herein. Thus, while particular examples and applications have been illustrated and described, it is to be understood that the disclosed examples are not limited to the precise construction and components disclosed herein. Various modifications, changes and variations, which will be apparent to those skilled in the art, can be made in the arrangement, operation, and details of the method and apparatus disclosed herein without departing from the spirit and scope defined in the appended claims.

Moreover, although the foregoing text sets forth a detailed description of numerous different examples, it should be understood that the scope of the patent is defined by the words of the claims set forth at the end of this patent. The detailed description is to be construed as example only and does not describe every possible example because describing every possible example would be impractical, if not impossible. Numerous alternative examples could be implemented, using either current technology or technology developed after the filing date of this patent, which would still fall within the scope of the claims. By way of example, and not limitation, the disclosure herein contemplates at least the following examples:

Example 1 is a method implemented by one or more processors, the method comprising: accessing threat assessment knowledge data representative of at least one of past security threat patterns, present security threat patterns, new security threat patterns, or evolving security threat patterns; accessing security solution knowledge data representative of at least one of past security solutions, present security solutions, new security solutions, or evolving security solutions; obtaining first security state data representing a current security state of a current computing environment; obtaining second security state data representing a future security state for a future secured-by-design computing environment; analyzing, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment; and causing the one or more aspects of the security governance to be displayed on a computing device.

Example 2 is the method of example 1, further comprising: obtaining first data and architecture state data representing a current data and architecture state of the current computing environment; obtaining second data and architecture state data representing a future data and architecture state for the future secured-by-design computing environment; and analyzing, using one or more second trained ML models, (i) data representing the one or more aspects of the security governance recommendations, (ii) the first data and architecture state data, or (iii) the second data and architecture state data to generate one or more cloud and/or on-premise deployment options for migrating the current computing environment to a future secured-by-design computing environment based upon the future security state; and causing a summary of the one or more cloud deployment options to be displayed on the computing device.

Example 3 is the method of either one of example 1 or example 2, wherein the one or more cloud deployment options include at least one of a one click deployment option or a manual deployment option via provided step-by-step instructions.

Example 4 is the method of any one of example 1 to example 3, further comprising:
obtaining domain knowledge data representative of business regulations, governance standards, rules and/or policies from a plurality of data sources;
obtaining first domain state data representing a current domain state of the current computing environment;
obtaining second domain state data representing a future domain state for the future computing environment; and
analyzing, using one or more third ML models, one or more of (i) the domain knowledge data, (ii) the first domain state data, or (iii) the second domain state data to identify a recommended set of one or more regulations, standards, policies and/or rules to be complied with for the future domain state,
wherein the one or more cloud deployment options are determined by analyzing, using the one or more second trained ML models, (i) data representing the one or more aspects of the security governance recommendations, (ii) the first data and architecture state data, (iii) the second data and architecture state data, (iv) the domain data, (v) the first domain state data, or (vi) the second domain state data.

Example 5 is the method of any one of example 1 to example 4, wherein obtaining the current security state data and the future security state data includes: processing one or more user inputs using natural language processing to determine the current security state data and the future security state data.

Example 6 is the method of any one of example 1 to example 5, further comprising: collecting security-related information from one or more sources; processing, using one or more second ML models, the collected security information to generate the threat assessment knowledge data, wherein the one or more aspects of the security governance recommendations are developed by the one or more first ML models using the threat assessment knowledge data; processing, using one or more third ML models, information representing one or more of actual threats, threat patterns, or security solutions to identify a new threat pattern; and in response to identifying a new threat pattern, updating the one or more second ML models.

Example 7 is the method of any one of example 1 to example 6, where the threat pattern knowledge data represents at least one of an internal threat or an external threat.

Example 8 is the method of any one of example 1 to example 7, further comprising: capturing, from one or more data sites using one or more network interfaces, information representative of at least one of reported threats, threat patterns, or security solutions for different industries and/or domains; and processing, using one or more second ML models, the collected information to generate reactive input knowledge data, wherein the one or more aspects of the security governance recommendations are developed by the one or more first ML models using the reactive input knowledge data.

Example 9 is the method of any one of example 1 to example 8, further comprising training the one or more first ML models by analyzing data from one or both of the threat assessment knowledge data, or the security solution knowledge data.

Example 10 is the method of any one of example 1 to example 9, wherein the one or more first ML models include at least one of a descriptive analytics ML model, a predictive analytics ML model, a diagnostic analytics ML model, or a prescriptive analytics ML model.

Example 11 is a computing system, comprising: one or more processors; and a non-transitory, computer-readable storage medium storing computer-readable instructions that, when executed by the one or more processors, cause the computing system to: access threat assessment knowledge data representative of at least one of past security threat patterns, present security threat patterns, new security threat patterns, or evolving security threat patterns; access security solution knowledge data representative of at least one of past security solutions, present security solutions, new security solutions, or evolving security solutions; obtain first security state data representing a current security state of a current computing environment; obtain second security state data representing a future security state for a future secured-by-design computing environment; analyze, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment; and cause the one or more aspects of the security governance to be displayed on a computing device.

Example 12 is the computing system of example 11, wherein the instructions, when executed by the one or more processors, cause the computing system to: obtain first data and architecture state data representing a current data and architecture state of the current computing environment; obtain second data and architecture state data representing a future data and architecture state for the future secured-by-design computing environment; analyze, using one or more second trained ML models, (i) data representing the one or more aspects of the security governance recommendations, (ii) the first data and architecture state data, or (iii) the second data and architecture state data to generate one or more cloud deployment options for migrating the current computing environment to a future secured-by-design computing environment based upon the future security state; and cause a summary of the one or more cloud deployment options to be displayed on the computing device.

Example 13 is the computing system of either one of example 11 or example 12, wherein the one or more cloud deployment options include at least one of a one click deployment option or a manual deployment option via provided step-by-step instructions.

Example 14 is the computing system of any one of example 11 to example 13, wherein the instructions, when executed by the one or more processors, cause the computing system to: obtain domain knowledge data representative of business regulations, governance standards, rules and/or policies from a plurality of data sources; obtain first domain state data representing a current domain state of the current computing environment; obtain second domain state data representing a future domain state for the future computing environment; and analyze, using one or more third ML models, one or more of (i) the domain knowledge data, (ii) the first domain state data, or (iii) the second domain state data to identify a recommended set of one or more regulations, standards, policies and/or rules to be complied with for the future domain state, wherein the one or more cloud deployment options are determined by analyzing, using the one or more second trained ML models, (i) data representing the one or more aspects of the security governance recommendations, (ii) the first data and architecture state data, (iii) the second data and architecture state data, (iv) the domain data, (v) the first domain state data, or (vi) the second domain state data.

Example 15 is the computing system of any one of example 11 to example 14, wherein the instructions, when executed by the one or more processors, cause the computing system to obtain the current security state data and the future security state data by: processing one or more user inputs using natural language processing to determine the current security state data and the future security state data.

Example 16 is the computing system of any one of example 11 to example 15, wherein the instructions, when executed by the one or more processors, cause the computing system to: collect security-related information from one or more sources; process, using one or more second ML models, the collected security information to generate the threat assessment knowledge data, wherein the one or more aspects of the security governance recommendations are developed by the one or more first ML models using the threat assessment knowledge data; process, using one or more third ML models, information representing one or more of actual threats, threat patterns, or security solutions to identify a new threat pattern; and in response to identifying a new threat pattern, update the one or more second ML models.

Example 17 is the computing system of any one of example 11 to example 16, wherein the instructions, when executed by the one or more processors, cause the computing system to: capture, from one or more data sites using one or more network interfaces, information representative of at least one of reported threats, threat patterns, or security solutions for different industries and/or domains; and process, using one or more second ML models, the collected information to generate reactive input knowledge data, wherein the one or more aspects of the security governance recommendations are developed by the one or more first ML models using the reactive input knowledge data.

Example 18 is a non-transitory, computer-readable, storage medium storing computer-readable instructions that, when executed by one or more processing devices, cause a system to: access threat assessment knowledge data representative of at least one of past security threat patterns, present security threat patterns, new security threat patterns, or evolving security threat patterns; access security solution knowledge data representative of at least one of past security solutions, present security solutions, new security solutions, or evolving security solutions; obtain first security state data representing a current security state of a current computing environment; obtain second security state data representing a future security state for a future secured-by-design computing environment; analyze, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment; and cause the one or more aspects of the security governance to be displayed on a computing device.

Example 19 is the storage medium of example 18, wherein the instructions, when executed by the one or more processors, cause the system to: obtain first data and architecture state data representing a current data and architecture state of the current computing environment; obtain second data and architecture state data representing a future data and architecture state for the future secured-by-design computing environment; analyze, using one or more second trained ML models, (i) data representing the one or more aspects of the security governance recommendations, (ii) the first data and architecture state data, or (iii) the second data and architecture state data to generate one or more cloud deployment options for migrating the current computing environment to a future secured-by-design computing environment based upon the future security state; and cause a summary of the one or more cloud deployment options to be displayed on the computing device.

Example 20 is the storage medium of either one of claim 18 or claim 19, wherein the instructions, when executed by the one or more processors, cause the system to: obtain domain knowledge data representative of business regulations, governance standards, rules and/or policies from a plurality of data sources; obtain first domain state data representing a current domain state of the current computing environment; obtain second domain state data representing a future domain state for the future computing environment; and analyze, using one or more third ML models, one or more of (i) the domain knowledge data, (ii) the first domain state data, or (iii) the second domain state data to identify a recommended set of one or more regulations, standards, policies and/or rules to be complied with for the future domain state, wherein the one or more cloud deployment options are determined by analyzing, using the one or more second trained ML models, (i) data representing the one or more aspects of the security governance recommendations, (ii) the first data and architecture state data, (iii) the second data and architecture state data, (iv) the domain data, (v) the first domain state data, or (vi) the second domain state data.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter can lie in less than all features of a single disclosed embodiment. Thus, the following claims are hereby incorporated into the Detailed Description, with each claim standing on its own as a separately claimed subject matter.

Thus, many modifications and variations can be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed is:

1. A method implemented by one or more processors, the method comprising:
    accessing threat assessment knowledge data representative of at least one of past security threat patterns, present security threat patterns, new security threat patterns, or evolving security threat patterns;
    accessing security solution knowledge data representative of i) at least one of past security solutions, present security solutions, new security solutions, or evolving security solutions and ii) identified internal and external remediation solutions and/or security solutions;
    obtaining first security state data representing a current security state of a current computing environment;
    obtaining second security state data representing a future security state for a future secured-by-design computing environment;
    analyzing, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment, wherein the one or more first trained ML models are trained using labeled historical data to analyze the security solution knowledge data to extract security knowledge data and to classify the security knowledge data based upon one or both of (i) a type of the security knowledge data and (ii) a source of the security knowledge data;
    causing the one or more aspects of the security governance recommendation to be displayed on a computing device;
    obtaining first data and architecture state data representing a current data and architecture state of the current computing environment;
    obtaining second data and architecture state data representing a future data and architecture state for the future secured-by-design computing environment;
    analyzing, using one or more second trained ML models, (i) data representing the one or more aspects of the security governance recommendation, (ii) the first data and architecture state data, or (iii) the second data and architecture state data to generate one or more cloud and/or on-premise deployment options for migrating the current computing environment to a future secured-by-design computing environment based upon the future security state; and
    causing a summary of the one or more cloud and/or on-premise deployment options to be displayed on the computing device.

2. The method of claim 1, wherein the one or more cloud deployment options include at least one of a one click deployment option or a manual deployment option via provided step-by-step instructions.

3. The method of claim 1, further comprising:
    obtaining domain knowledge data representative of business regulations, governance standards, rules and/or policies from a plurality of data sources;
    obtaining first domain state data representing a current domain state of the current computing environment;
    obtaining second domain state data representing a future domain state for the future computing environment; and
    analyzing, using one or more third ML models, one or more of (i) the domain knowledge data, (ii) the first domain state data, or (iii) the second domain state data to identify a recommended set of one or more regulations, standards, policies and/or rules to be complied with for the future domain state,
    wherein the one or more cloud deployment options are determined by analyzing, using the one or more second trained ML models, (i) data representing the one or more aspects of the security governance recommendation, (ii) the first data and architecture state data, (iii) the second data and architecture state data, (iv) the domain knowledge data, (v) the first domain state data, or (vi) the second domain state data.

4. The method of claim 1, wherein obtaining the current security state data and the future security state data includes:
    processing one or more user inputs using natural language processing to determine the current security state data and the future security state data.

5. The method of claim 1, further comprising:
    collecting security-related information from one or more sources;
    processing, using one or more second ML models, the collected security information to generate the threat assessment knowledge data, wherein the one or more aspects of the security governance recommendation are developed by the one or more first trained ML models using the threat assessment knowledge data;
    processing, using one or more third ML models, information representing one or more of actual threats, threat patterns, or security solutions to identify a new threat pattern; and
    in response to identifying a new threat pattern, updating the one or more second ML models.

6. The method of claim 1, where the threat pattern knowledge data represents at least one of an internal threat or an external threat.

7. The method of claim 1, further comprising:
capturing, from one or more data sites using one or more network interfaces, information representative of at least one of reported threats, threat patterns, or security solutions for different industries and/or domains; and
processing, using one or more second ML models, the collected information to generate reactive input knowledge data, wherein the one or more aspects of the security governance recommendation are developed by the one or more first trained ML models using the reactive input knowledge data.

8. The method of claim 1, further comprising training the one or more first trained ML models by analyzing data from one or both of the threat assessment knowledge data, or the security solution knowledge data.

9. The method of claim 1, wherein the one or more first trained ML models include at least one of a descriptive analytics ML model, a predictive analytics ML model, a diagnostic analytics ML model, or a prescriptive analytics ML model.

10. A computing system, comprising:
one or more processors; and
a non-transitory, computer-readable storage medium storing computer-readable instructions that, when executed by the one or more processors, cause the computing system to:
  access threat assessment knowledge data representative of at least one of past security threat patterns, present security threat patterns, new security threat patterns, or evolving security threat patterns;
  access security solution knowledge data representative of i) at least one of past security solutions, present security solutions, new security solutions, or evolving security solutions and ii) identified internal and external remediation solutions and/or security solutions;
  obtain first security state data representing a current security state of a current computing environment;
  obtain second security state data representing a future security state for a future secured-by-design computing environment;
  analyze, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment, wherein the one or more first trained ML models are trained using labeled historical data to analyze the security solution knowledge data to extract security knowledge data and to classify the security knowledge data based upon one or both of (i) a type of the security knowledge data and (ii) a source of the security knowledge data;
  cause the one or more aspects of the security governance recommendation to be displayed on a computing device;
  obtain first data and architecture state data representing a current data and architecture state of the current computing environment;
  obtain second data and architecture state data representing a future data and architecture state for the future secured-by-design computing environment;
  analyze, using one or more second trained ML models, (i) data representing the one or more aspects of the security governance recommendation, (ii) the first data and architecture state data, or (iii) the second data and architecture state data to generate one or more cloud deployment options for migrating the current computing environment to a future secured-by-design computing environment based upon the future security state; and
  cause a summary of the one or more cloud and/or on-premise deployment options to be displayed on the computing device.

11. The computing system of claim 10, wherein the one or more cloud deployment options include at least one of a one click deployment option or a manual deployment option via provided step-by-step instructions.

12. The computing system of claim 10, wherein the instructions, when executed by the one or more processors, cause the computing system to:
  obtain domain knowledge data representative of business regulations, governance standards, rules and/or policies from a plurality of data sources;
  obtain first domain state data representing a current domain state of the current computing environment;
  obtain second domain state data representing a future domain state for the future computing environment; and
  analyze, using one or more third ML models, one or more of (i) the domain knowledge data, (ii) the first domain state data, or (iii) the second domain state data to identify a recommended set of one or more regulations, standards, policies and/or rules to be complied with for the future domain state,
wherein the one or more cloud deployment options are determined by analyzing, using the one or more second trained ML models, (i) data representing the one or more aspects of the security governance recommendation, (ii) the first data and architecture state data, (iii) the second data and architecture state data, (iv) the domain knowledge data, (v) the first domain state data, or (vi) the second domain state data.

13. The computing system of claim 10, wherein the instructions, when executed by the one or more processors, cause the computing system to obtain the current security state data and the future security state data by:
  processing one or more user inputs using natural language processing to determine the current security state data and the future security state data.

14. The computing system of claim 10, wherein the instructions, when executed by the one or more processors, cause the computing system to:
  collect security-related information from one or more sources;
  process, using one or more second ML models, the collected security information to generate the threat assessment knowledge data, wherein the one or more aspects of the security governance recommendation are developed by the one or more first trained ML models using the threat assessment knowledge data;
  process, using one or more third ML models, information representing one or more of actual threats, threat patterns, or security solutions to identify a new threat pattern; and
  in response to identifying a new threat pattern, update the one or more second ML models.

15. The computing system of claim 10, wherein the instructions, when executed by the one or more processors, cause the computing system to:
  capture, from one or more data sites using one or more network interfaces, information representative of at least one of reported threats, threat patterns, or security solutions for different industries and/or domains; and process, using one or more second ML models, the collected information to generate reactive input knowledge data, wherein the one or more aspects of the security governance recommendation are developed by the one or more first trained ML models using the reactive input knowledge data.

16. A non-transitory, computer-readable, storage medium storing computer-readable instructions that, when executed by one or more processing devices, cause a system to:

access threat assessment knowledge data representative of at least one of past security threat patterns, present security threat patterns, new security threat patterns, or evolving security threat patterns;

access security solution knowledge data representative of i) at least one of past security solutions, present security solutions, new security solutions, or evolving security solutions and ii) identified internal and external remediation solutions and/or security solutions;

obtain first security state data representing a current security state of a current computing environment;

obtain second security state data representing a future security state for a future secured-by-design computing environment;

analyze, using one or more first trained machine learning (ML) models, one or more of (i) the threat assessment knowledge data, (ii) the security solution knowledge data, (iii) the first security state data, or (iv) the second security state data to develop one or more aspects of a security governance recommendation for the future secured-by-design computing environment, wherein the one or more first trained ML models are trained using labeled historical data to analyze the security solution knowledge data to extract security knowledge data and to classify the security knowledge data based upon one or both of (i) a type of the security knowledge data and (ii) a source of the security knowledge data;

cause the one or more aspects of the security governance to be displayed on a computing device;

obtain first data and architecture state data representing a current data and architecture state of the current computing environment;

obtain second data and architecture state data representing a future data and architecture state for the future secured-by-design computing environment;

analyze, using one or more second trained ML models, (i) data representing the one or more aspects of the security governance recommendation, (ii) the first data and architecture state data, or (iii) the second data and architecture state data to generate one or more cloud deployment options for migrating the current computing environment to a future secured-by-design computing environment based upon the future security state;

cause a summary of the one or more cloud and/or on-premise deployment options to be displayed on the computing device.

17. The storage medium of claim 16, wherein the instructions, when executed by the one or more processors, cause the system to:

obtain domain knowledge data representative of business regulations, governance standards, rules and/or policies from a plurality of data sources;

obtain first domain state data representing a current domain state of the current computing environment;

obtain second domain state data representing a future domain state for the future computing environment; and analyze, using one or more third ML models, one or more of (i) the domain knowledge data, (ii) the first domain state data, or (iii) the second domain state data to identify a recommended set of one or more regulations, standards, policies and/or rules to be complied with for the future domain state, wherein the one or more cloud deployment options are determined by analyzing, using the one or more second trained ML models, (i) data representing the one or more aspects of the security governance recommendation, (ii) the first data and architecture state data, (iii) the second data and architecture state data, (iv) the domain knowledge data, (v) the first domain state data, or (vi) the second domain state data.

* * * * *

UNITED STATES PATENT AND TRADEMARK OFFICE
CERTIFICATE OF CORRECTION

PATENT NO. : 11,811,797 B2
APPLICATION NO. : 17/716030
DATED : November 7, 2023
INVENTOR(S) : Rares Almasan et al.

Page 1 of 1

It is certified that error appears in the above-identified patent and that said Letters Patent is hereby corrected as shown below:

In the Claims

Column 40, Line 13, Claim 16, "state;" should be -- state; and --.

Signed and Sealed this
Twenty-first Day of October, 2025

John A. Squires
*Director of the United States Patent and Trademark Office*